(12) United States Patent  (10) Patent No.: US 10,115,216 B2
Ishida et al.  (45) Date of Patent: Oct. 30, 2018

(54) DISPLAY CONTROL APPARATUS, DISPLAY CONTROL METHOD, AND PROGRAM

(71) Applicant: CANON KABUSHIKI KAISHA, Tokyo (JP)

(72) Inventors: Tomoya Ishida, Yokohama (JP); Masao Kato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/226,749

(22) Filed: Aug. 2, 2016

(65) Prior Publication Data

US 2017/0039747 A1 Feb. 9, 2017

(30) Foreign Application Priority Data

Aug. 7, 2015 (JP) .................. 2015-157715

(51) Int. Cl.
  *G06T 11/60* (2006.01)
  *G06T 1/00* (2006.01)
(52) U.S. Cl.
  CPC ............ *G06T 11/60* (2013.01); *G06T 1/0007* (2013.01)
(58) Field of Classification Search
  None
  See application file for complete search history.

(56) References Cited

U.S. PATENT DOCUMENTS

| 2003/0072486 A1* | 4/2003 | Loui ............... G06T 11/60 382/175 |
| 2005/0134946 A1* | 6/2005 | Tsue ............... G06T 11/60 358/537 |
| 2006/0080719 A1* | 4/2006 | Minatogawa ...... H04N 1/00127 725/105 |
| 2008/0205789 A1* | 8/2008 | Ten Kate ........... G06T 11/60 382/284 |
| 2009/0116752 A1* | 5/2009 | Isomura ........... G06F 17/30265 382/217 |
| 2009/0249177 A1* | 10/2009 | Yamaji ............. G06T 11/60 715/204 |
| 2013/0004073 A1* | 1/2013 | Yamaji ............. G06T 11/60 382/173 |

(Continued)

FOREIGN PATENT DOCUMENTS

JP  5449460 B2  3/2014

*Primary Examiner* — Yu Chen

(74) *Attorney, Agent, or Firm* — Canon U.S.A., Inc. IP Division

(57) ABSTRACT

A display control apparatus includes an acquiring unit, a first control unit, a selecting unit, a second control unit, a switching unit, and an arranging unit. The acquiring unit acquires an image group including pieces of image data. The first control unit displays a layout image in which images selected from the acquired image group are arranged in slots. The selecting unit selects a change target slot in which an image to be changed is arranged from the slots in the displayed layout image. The second control unit displays candidate images which are selected based on the image arranged in the change target slot. The switching unit switches the displayed candidate images to candidate images selected based on an image arranged in a slot different from the change target slot. The arranging unit arranges a candidate image selected from the displayed candidate images in the change target slot.

34 Claims, 18 Drawing Sheets

(56) References Cited

U.S. PATENT DOCUMENTS

| | | | | |
|---|---|---|---|---|
| 2013/0155088 A1* | 6/2013 | Wang | ............... | G06T 1/0007 |
| | | | | 345/581 |
| 2014/0079324 A1* | 3/2014 | Ishige | ............... | G06T 11/60 |
| | | | | 382/224 |
| 2016/0139761 A1* | 5/2016 | Grosz | ............... | G06F 3/1243 |
| | | | | 715/769 |

* cited by examiner

FIG. 10

| IMAGE ID | IMAGE CAPTURING DATE AND TIME | FOCUSING | NUMBER OF FACES | PERSONAL ID | | | | | |
|---|---|---|---|---|---|---|---|---|---|
| | | | | 1 | | 2 | | 3 | |
| | | | | UPPER LEFT POSITION | LOWER RIGHT POSITION | UPPER LEFT POSITION | LOWER RIGHT POSITION | UPPER LEFT POSITION | LOWER RIGHT POSITION |
| 1 | July/01/2015 10h11m12s | ○ | 6 | 40,40 | 65,65 | 90,40 | 115,65 | 10,20 | 25,35 |
| 2 | July/01/2015 10h12m30s | ○ | 3 | 50,100 | 100,150 | 150,125 | 190,165 | 150,125 | 190,165 |
| 3 | July/01/2015 10h15m54s | ○ | 0 | - | - | - | - | - | - |
| ... | ... | ... | ... | ... | ... | ... | ... | ... | ... |

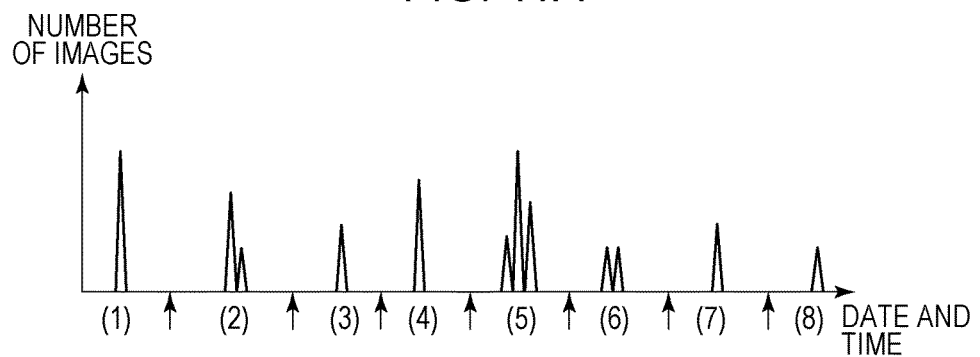
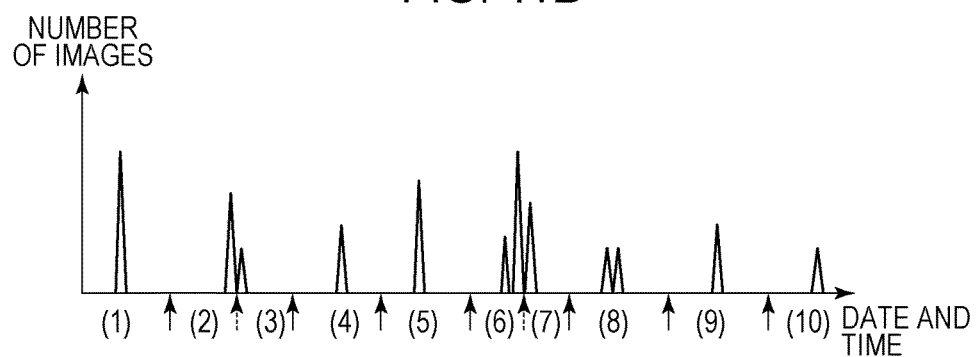
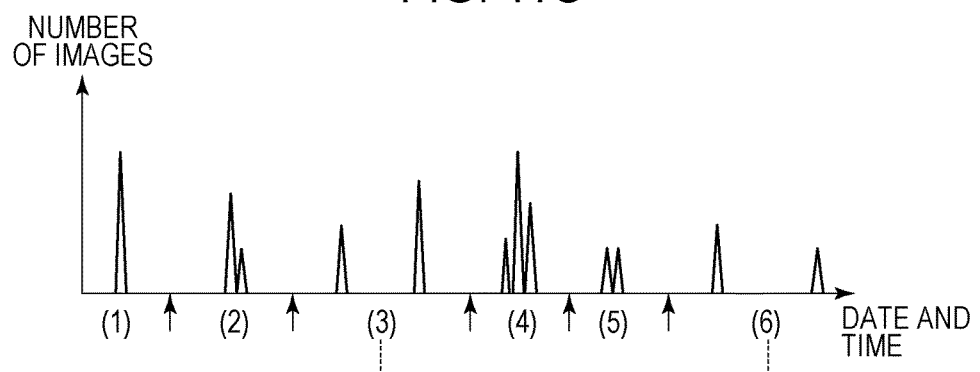

FIG. 12

| SCENE | IMAGE CAPTURING PERIOD (TIME) | | NUMBER OF CAPTURED IMAGES | | NUMBER OF PERSONS IN ONE IMAGE | |
|---|---|---|---|---|---|---|
| | AVERAGE | STANDARD DEVIATION | AVERAGE | STANDARD DEVIATION | AVERAGE | STANDARD DEVIATION |
| TRAVEL | 33.221 | 4.778 | 324.857 | 393.691 | 1.506 | 0.256 |
| USUAL DAY | 3.336 | 4.671 | 54.892 | 108.805 | 1.465 | 0.974 |
| CEREMONY | 4.634 | 1.532 | 165.457 | 71.055 | 2.547 | 0.527 |

FIG. 13A

| SCENE | FEATURE OF IMAGE IN MAIN SLOT | FEATURE OF IMAGE IN SUB-SLOT |
|---|---|---|
| TRAVEL | ZOOM-OUT IMAGE INCLUDING PERSON AND LANDSCAPE | CLOSE-UP IMAGE AND/OR PROFILE IMAGE |
| USUAL DAY | CLOSE-UP IMAGE AND/OR PROFILE IMAGE | ZOOM-OUT IMAGE INCLUDING PERSON AND LANDSCAPE |
| CEREMONY | IMAGE INCLUDING TWO PERSONS CLOSE TO EACH OTHER | IMAGE INCLUDING MANY PERSONS |

FIG. 13B

| IMAGE ID | SCORE (PERFECT SCORE IS 50 POINTS) | |
|---|---|---|
| | MAIN SLOT (POINTS) | SUB-SLOT (POINTS) |
| 1 | 20 | 40 |
| 2 | 45 | 10 |
| 3 | 10 | 20 |
| ... | ... | ... |

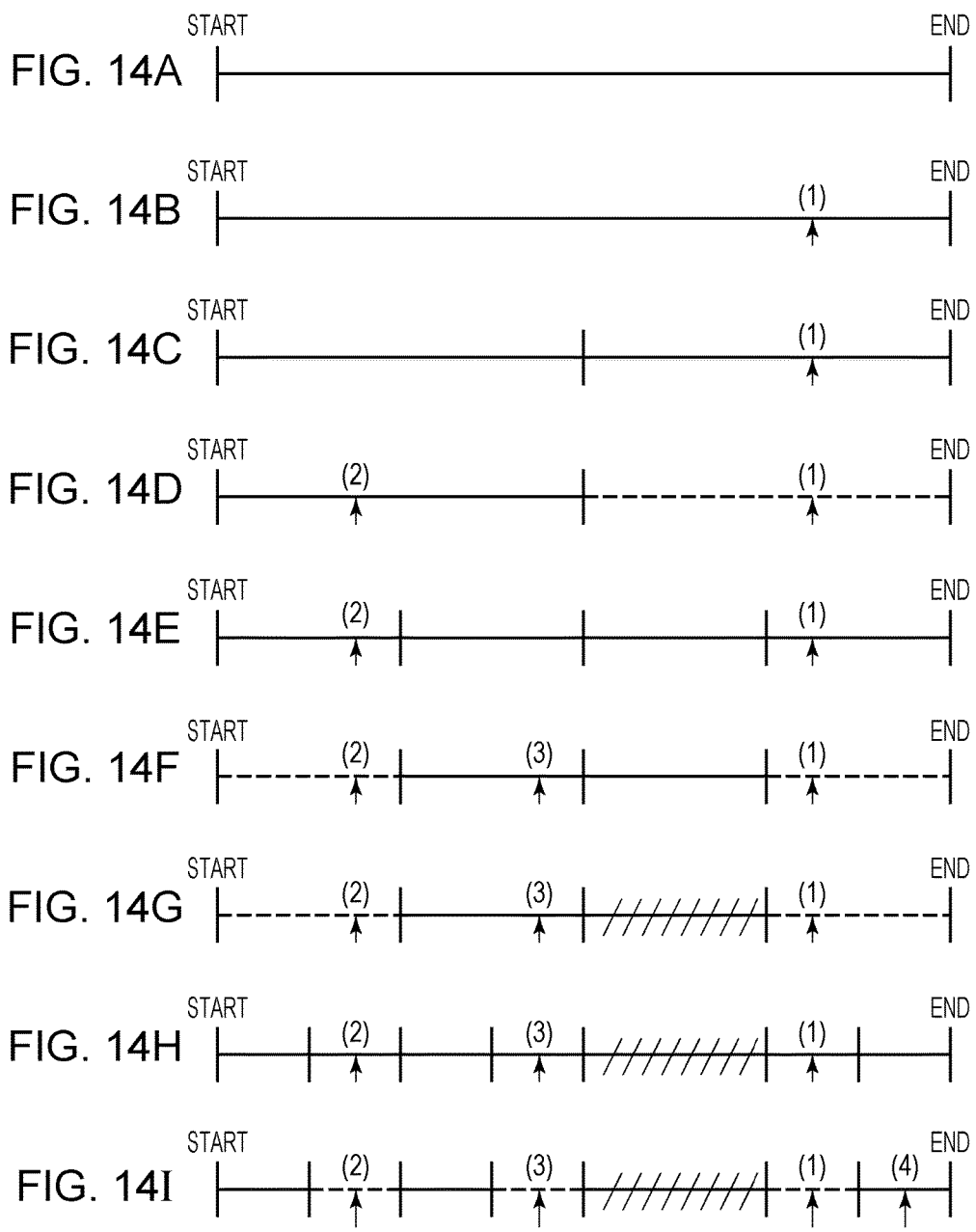

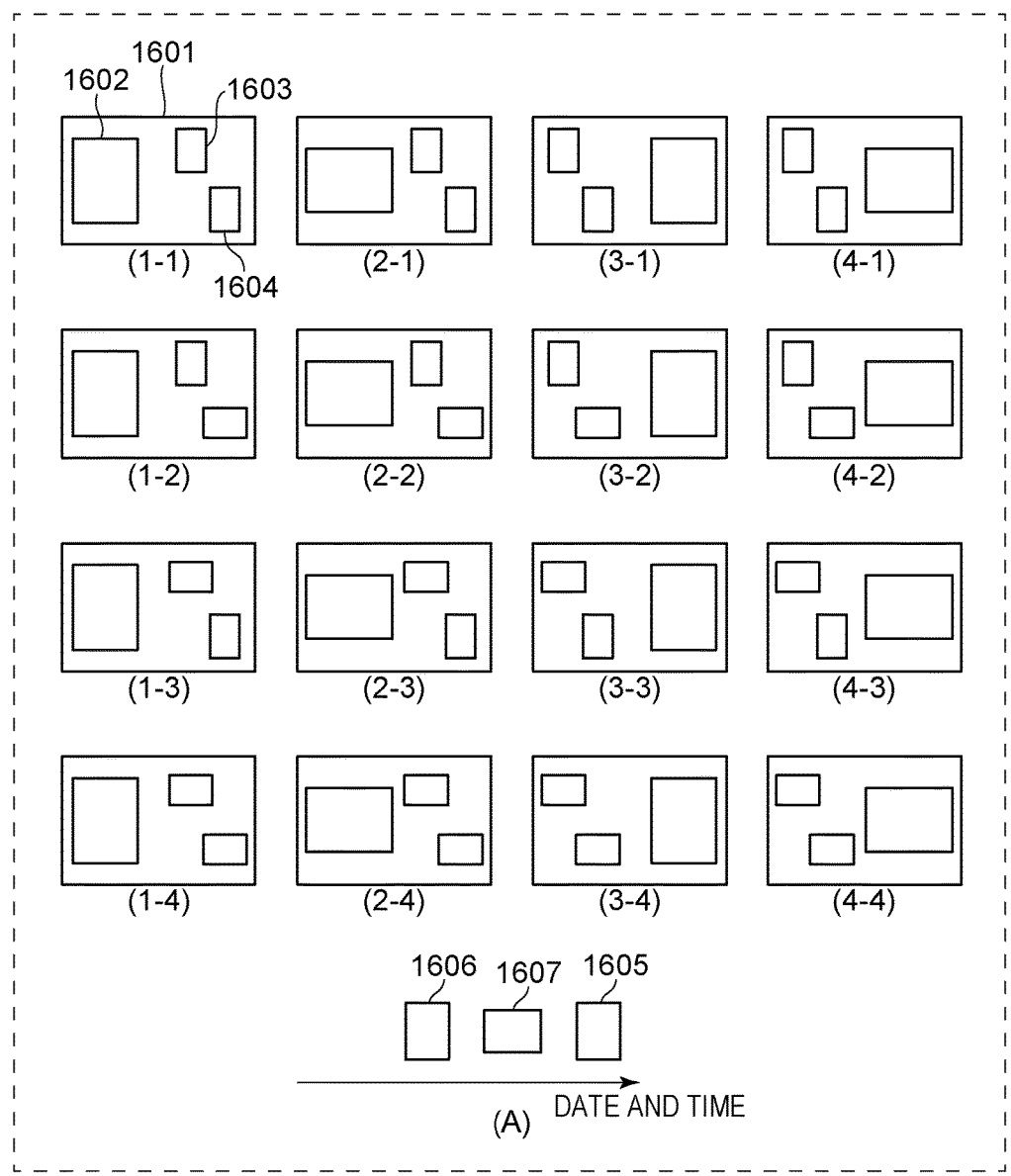

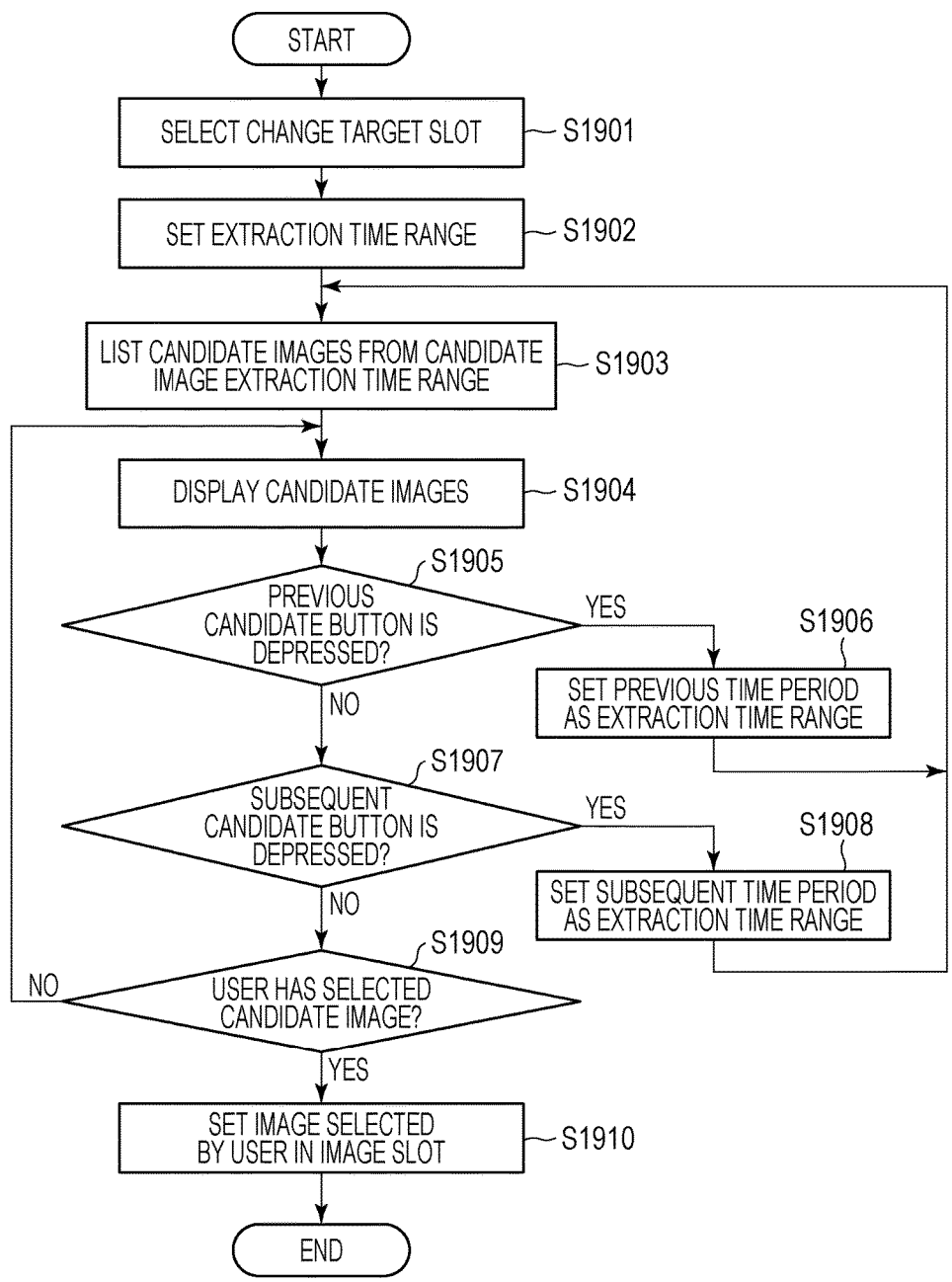

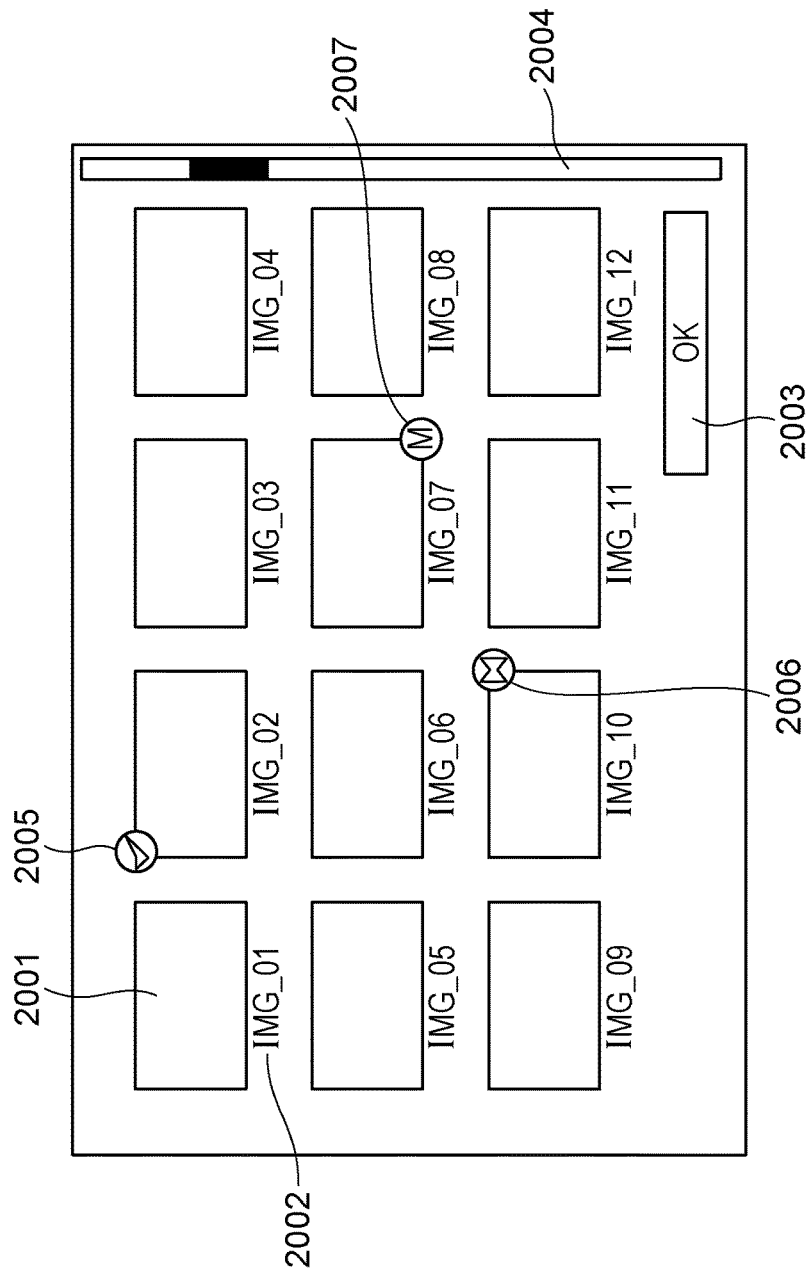

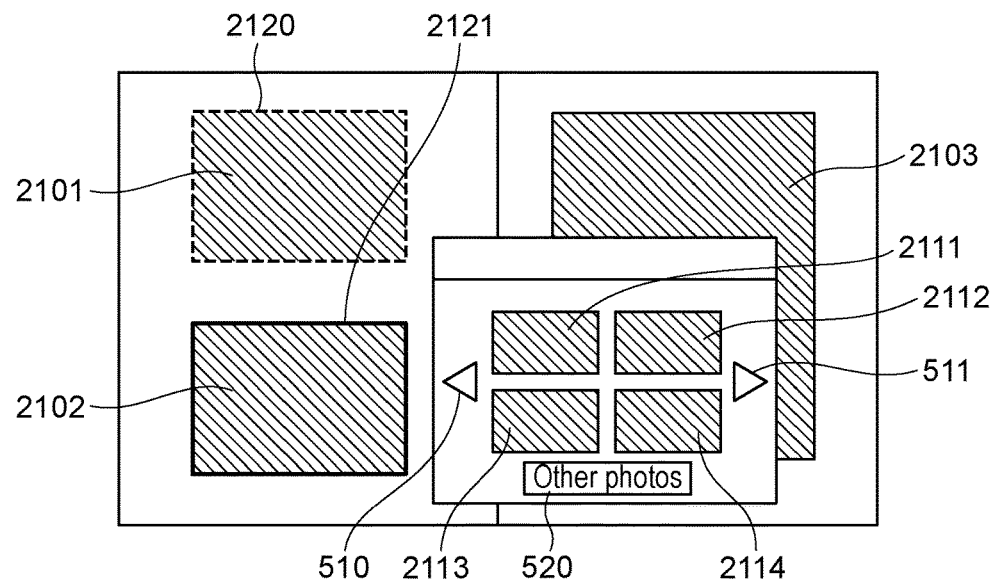
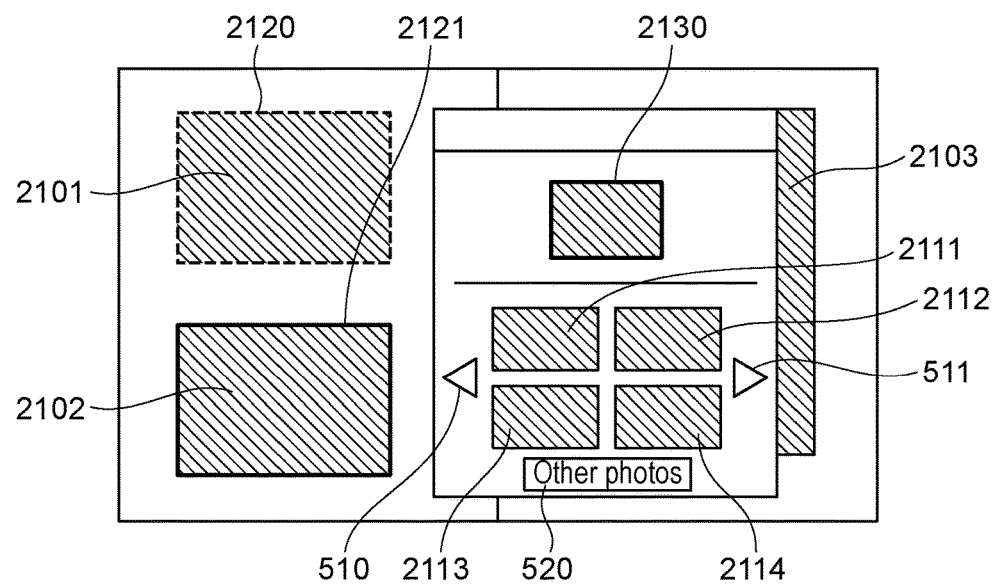

DISPLAY CONTROL APPARATUS, DISPLAY CONTROL METHOD, AND PROGRAM

BACKGROUND OF THE INVENTION

Field of the Invention

The present invention relates to a display control apparatus, a display control method, and program. More particularly, the present invention relates to a display control apparatus, a display control method, and a program, which process image data.

Description of the Related Art

Some image processing apparatuses display images based on image data on a display screen of a liquid crystal display (LCD) composing a user interface and specify an image displayed on the display screen to edit the image. In image processing apparatuses that edit a photo album, an image slot is arranged on each page of the photo album. Allocation of photos to the image slot allows a desired. layout image to be generated. Some applications for creating a photo album automatically allocate images, among multiple photos specified by a user, according to the template of the photo album. Since images desired by the users may not be allocated in the automatic allocation of images, the images are desirably changed. In a technology disclosed in Japanese Patent No. 5449460, multiple images specified by a user are divided into groups and the groups are associated with the paces of a photo album. In the change of the images in each image slot, candidate images selected from the group corresponding to the page are displayed.

In Japanese Patent No. 5449460, many candidate images are displayed when the user specifies many images. In addition, the images allocated to each page of the photo album are displayed as the candidate images and the candidate images corresponding to the image slot the images in which are to be changed are not displayed.

SUMMARY OF THE INVENTION

According to an embodiment, a display control apparatus includes an acquiring unit configured to acquire an image group including a plurality of pieces of image data, a first display control unit configured to display, on a display screen, a layout image in which images selected from the image group acquired by the acquiring unit are arranged in slots, a selecting unit configured to select a change target slot in which an image to be changed is arranged from the slots in the layout image displayed on the display screen, a second display control unit configured to display, on the display screen, candidate images which are selected based on the image arranged in the change target slot, a switching unit configured to switch the candidate images displayed by the second display control unit to candidate images selected based on an image arranged in a slot different from the change target slot, and an arranging unit configured to arrange a candidate image selected from the candidate images displayed by the second display control unit in the change target slot.

Further features of the present invention will become apparent from the following description of exemplary embodiments with reference to the attached drawings.

BRIEF DESCRIPTION OF THE DRAWINGS

FIG. 10 is a diagram for describing image analysis information according to the first embodiment.

FIGS. 11A to 11C are diagrams for describing image group division according to the first embodiment.

FIG. 12 is a diagram for describing scene classification according to the first embodiment.

FIGS. 13A and 13B are diagrams for describing scoring according to the first embodiment.

FIGS. 14A to 14I are diagrams for describing image selection according to the first embodiment.

FIG. 15 is a diagram for describing image layout according to the first embodiment.

FIG. 18 is a flowchart illustrating an exemplary display process of the candidate images according to the second embodiment.

FIG. 19 illustrates an exemplary list of images according to the first embodiment.

FIGS. 20A and 20B illustrate exemplary editing screens according to the first embodiment.

DESCRIPTION OF THE EMBODIMENTS

Embodiments of the present invention will herein be described in detail with reference to the attached. drawings. The invention according to the appended claims is not limited to the embodiments described below and all the combinations of features described in the embodiments are not necessarily essential to the present invention.

<First Embodiment>

Figure 1:
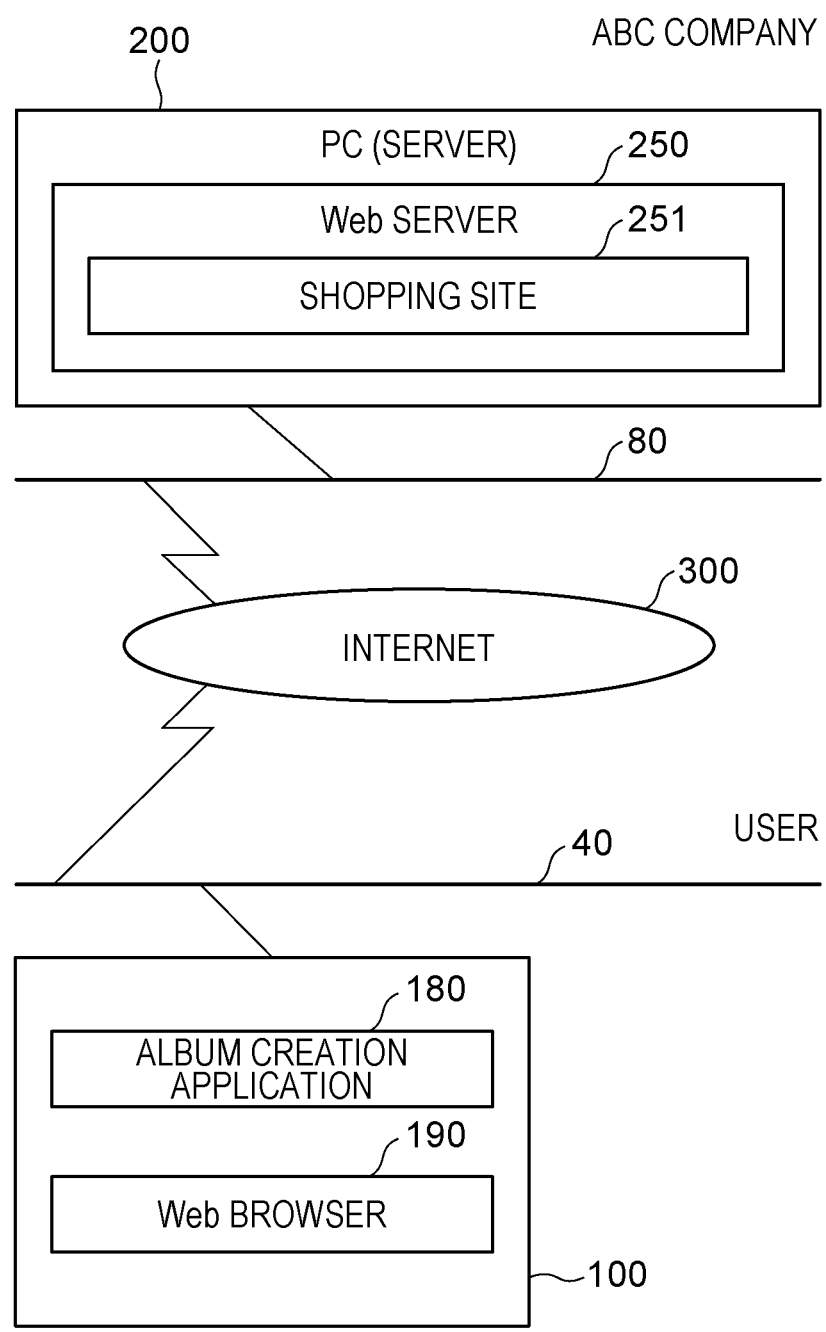
FIG. 1 illustrates an exemplary configuration of an information processing system including an information processing apparatus according to a first embodiment.

FIG. 1 illustrates an exemplary configuration of an information processing system for creating and ordering a photo album. Referring to FIG. 1, the information processing system includes an information processing apparatus 100 used by a user and an information processing apparatus 200 of a photo album production company. The information processing apparatus 100 is connected to the information processing apparatus 200 via the Internet 300. The information processing apparatus 100 is, for example, a personal computer (PC). The information processing apparatus 200 is, for example, a server PC. An operating system (hereinafter sometimes abbreviated to OS) equivalent to Windows (registered trademark) 8 or Windows (registered trademark) Server 2012 is installed in the information processing apparatus 100 and the information processing apparatus 200. The information processing apparatus 100 is connected to an Ethernet network 40 and the information processing apparatus 200 is connected to an Ethernet network 80.

An application 180 (hereinafter also referred to as an album application) for creating a photo album is installed in the information processing apparatus 100. The application is composed of, for example, Windows (registered trademark) executable files (*.exe). In addition, a Web browser application 190 (hereinafter also referred to as a Web browser) is installed in the information processing apparatus 100. The Web browser 190 is used by the user to access World Wide Web (WWW). The network 40 is a network for the user using the information processing apparatus 100 and is, for example, a home network.

The information processing apparatus 200 includes a Web server 250 having a Web server function, which provides, for example, a Web site of an ABC company via the Internet 300. A shopping site 251 is provided by the ABC company for users. Each user is capable of ordering a photo album using the shopping site 251.

Figure 2:
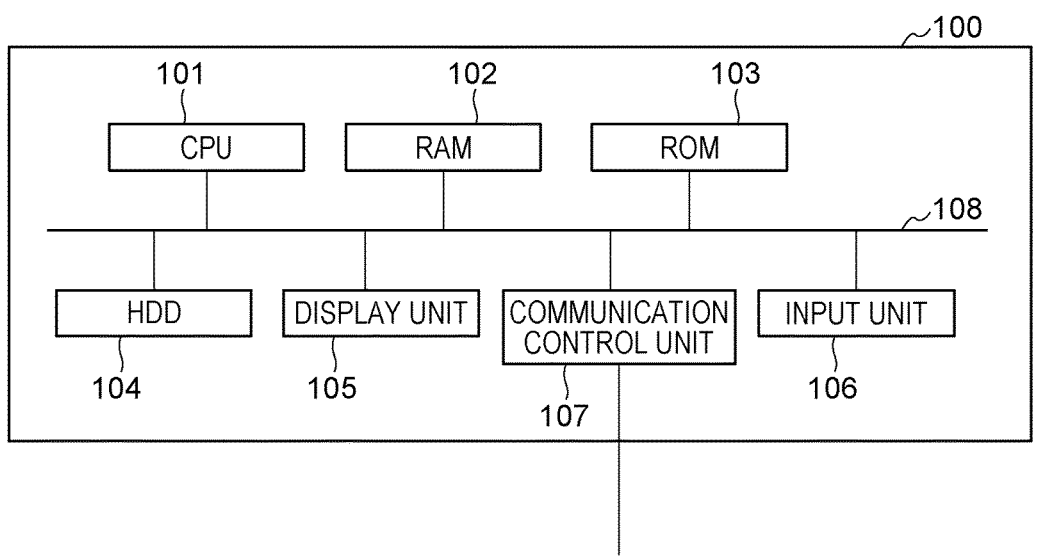
FIG. 2 is a block diagram illustrating an exemplary hardware configuration of a PC according to the first embodiment.

FIG. 2 is a block diagram illustrating an exemplary hardware configuration of the information processing apparatus 100. The information processing apparatus 200 has the same configuration as that of the information processing apparatus 100. However, the information processing apparatus 100 does not necessarily have the same configuration as that of the information processing apparatus 200. Referring to FIG. 2, the information processing apparatus includes a central processing unit (CPU) 101, a random access memory (RAM) 102, a read only memory (ROM) 103, an hard disk drive (HDD) 104, a display unit 105, an input unit 106, and a communication control unit 107, which are connected to each other via a system bus 108.

The CPU 101 is a system control unit and controls the entire information processing apparatus 100. The CPU 101 performs a display control method described in the embodiments according to programs.

The RAM 102 is a memory that temporarily stores a variety of information in the execution of the programs by the CPU 101. The ROM 103 stores the programs executed by the CPU 101.

The HDD 104 Is a storage medium for storing, for example, a database that holds image files and results of processing, such as image analysis. The HDD 104 stores applications including the album application 180 and the Web browser 190 and each module (software) described below with reference to FIG. 3. The applications and each module are read out to the PAM 102, if needed, to be executed by the CPU 101. The CPU 101 realizes the functions of the applications including the application 180 and the Web browser 190 and each module (software) illustrated in FIG. 3 in the above manner.

The display unit 105 displays a user interfaces (UT) of the first embodiment and results of layout of images for the user. The display unit 105 may be provided with a touch sensor function. The input unit 106 is used by the user to perform various operations. For example, the input unit 106 is used by the user to input certain information into the UT displayed in the display unit 105.

The communication control unit 107 is used to communicate with an external apparatus, such as a printer or a server. For example, album data generated through automatic layout is transmitted to the server 200 via the communication control unit 107.

Figure 3:
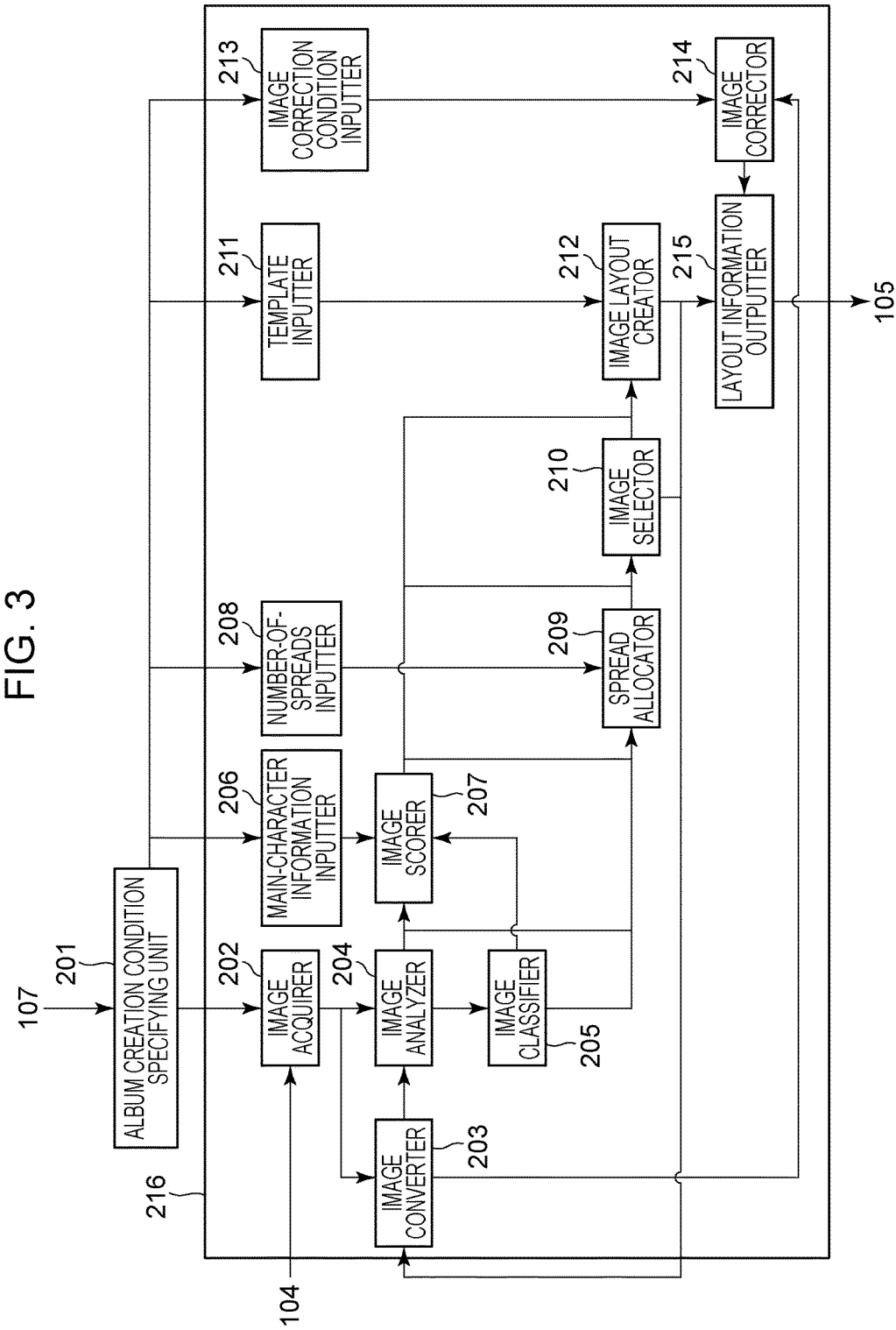
FIG. 3 is an exemplary software block diagram of an application according to the first embodiment.

FIG. 3 is an exemplary software block diagram of an album creation application according to the embodiments of the present invention. Although the album creation application has various functions, an automatic layout function provided by an automatic layout processing unit 216 will be particularly described in the first embodiment. The automatic layout function is used to classify or select photos that are taken based on their content and attributes and lay out the photos in order to generate an album image to be displayed in the display unit 105.

In the first embodiment, the album creation application stored in the HDD 104 is started upon depression of an icon of the application displayed in the display unit 105 by the user. Referring to FIG. 3, the album creation application includes an album creation condition specifying unit 201 and the automatic layout processing unit 216.

The album creation condition specifying unit 201 specifies album creation conditions for the automatic layout processing unit 216 in response to an operation on the UT by a user. In the first embodiment, a main character, the number of spreads, a template type, and whether image correction is to be performed are specified as the album creation conditions. The spread corresponds to one display window in display and corresponds to a pair of pages which are printed on different sheets and which are adjacent to each other in printing.

An image acquirer 202 acquires an image group specified by the album creation condition specifying unit 201 from the HDD 104. The image group means candidate images to be laid out in creation of one album. For example, when Jan. 1, 2015 to Dec. 31, 2015 are specified by the album creation condition specifying unit 201, all the images captured from Jan. 1, 2015 to Dec. 31, 2015 correspond to the specified image group.

The images stored in the HDD 104 include still images and cut-out images cut out from videos. The still images and the cut-out images are acquired with an imaging device, such as a digital camera or a smart device. The imaging device may be provided in the information processing apparatus 100 or may be provided in an external apparatus. When the imaging device is provided in an external apparatus, the images are acquired via the communication control unit 107. The still images and the cut-out images may be acquired from the network or the server via the communication control unit 107. The images acquired from the network or the server include social networking service images (hereinafter referred to as "SNS images"). Data associated with each image is analyzed to determine where the image is stored. In the case of the SNS images, the images may be acquired from the corresponding SNSs via the application to manage the SNSs from which the images are acquired in the application. The images are not limited to the above ones and may be images of other kinds.

An image converter 203 converts a pixel count and color information in image data. In the first embodiment, it is assumed that the image data is converted into image data having a pixel count of 420 pixels on narrow sides and having color information in an sRGB color space.

An image analyzer 204 analyzes the image data. In the first embodiment, the image analyzer 204 analyzes the image data subjected to the conversion in the image converter 203. Specifically, the image analyzer 204 acquires a feature value from the image data and performs detection of a face in the image data, recognition of the expression of the detected face, and personal recognition of the detected face. In addition, the image analyzer 204 acquires a date and time when the image is captured from the data (for example, Exif information) associated with the image acquired from the HDD 104.

An image classifier 205 performs scene division to the acquired image group, that is, the image group specified by the album creation condition specifying unit 201. The scene division is performed using the information indicating the date and time when the image is captured, information about the number of images, and the detected face information. The scene is an image capturing scene, such as Travel, Usual day, or Wedding ceremony. The scene can be said to be a collection of images that have been captured at one image capturing opportunity for one target.

A main-character information inputter 206 supplies an identifier (ID) (identification information) of a main character specified by the album creation condition specifying unit 201 to an image scorer 207.

The image scorer 207 gives a score to each image. In the first embodiment, a score is given to each image so that an image appropriate for the layout has a high score. In the giving of a score to each image so that an image appropriate for the layout has a high score, the information acquired in the image analyzer 204 and the information acquired in the image classifier 205 are used in the first embodiment. Other information may be additionally or alternatively used. In addition, in the first embodiment, the image scorer 207 gives a score to each image so that the image including the main character ID supplied from the main-character information inputter 206 has a high score.

A number-of-spreads inputter 208 supplies the number of spreads of the album, which is specified by the album creation condition specifying unit 201, to spread allocator 209.

The spread allocator 209 divides the image group to allocate the images resulting from the division to each spread. The spread is, for example, a two-page spread in the album that is created. The spread allocator 209 divides the image group in accordance with the number of spreads, which is input, to allocate part of the image group to each spread. For example, when the number of spreads is five, the acquired image group is divided into five to create small image groups and one small image group is allocated to each spread.

An image selector 210 selects an image from the snail image group allocated to each spread in the spread allocator 209 based on the scores given to the images in the image scorer 207.

A template inputter 211 supplies multiple templates corresponding to template information specified by the album creation condition specifying unit 201 to an image layout creator 212.

The image layout creator 212 determines a layout of the images. Specifically, the image layout creator 212 selects a template appropriate for the image selected by the image selector 210 from the multiple templates supplied from the template inputter 211 to determine the layout (arrangement position) of each image.

A layout information outputter 215 outputs layout information for display in the display unit 105 in accordance with the image layout determined by the image layout creator 212. The layout information is, for example, bitmap data in which a selected image is laid out (arranged) in a selected template.

An image corrector 214 performs dodging correction, red-eye correction, and contrast correction. An image correction condition inputter 213 supplies ON-OFF conditions of the image correction, specified by the album creation condition specifying unit 201, to the image corrector 214. The image corrector 214 performs the correction to the image if the image correction condition is ON. The image corrector 214 des not perform the correction if the image correction condition is OFF. Turning on or off of the image correction may be specified for each kind of correction or may be collectively specified for all kinds of correction. The pixel count of the image, which is supplied from the image converter 203 to the image corrector 214, may be varied in accordance with the size of the layout image determined by the image layout creator 212. Although the image correction is performed to each image after the layout image is generated in the first embodiment, the image correction is not limited to this timing. Each image may be subjected to the correction before the layout (arrangement) of the image on the spread. The image data output from the layout information. outputter 215 is displayed in the display unit 105, for example, in a format illustrated in FIG. 4.

Upon installation of the album creation application of the first embodiment in the information processing apparatus 100, a start-up icon is displayed on a top screen (desktop) of the OS running on the information processing apparatus 100. The program of the album creation application stored in the HDD 104 is loaded into the ROM 103 in response to depression of the start-up icon on the top screen displayed in the display unit 105 by the user. The program loaded into the ROM 103 is executed by the CPU 101 to start the album creation application.

Figure 4:
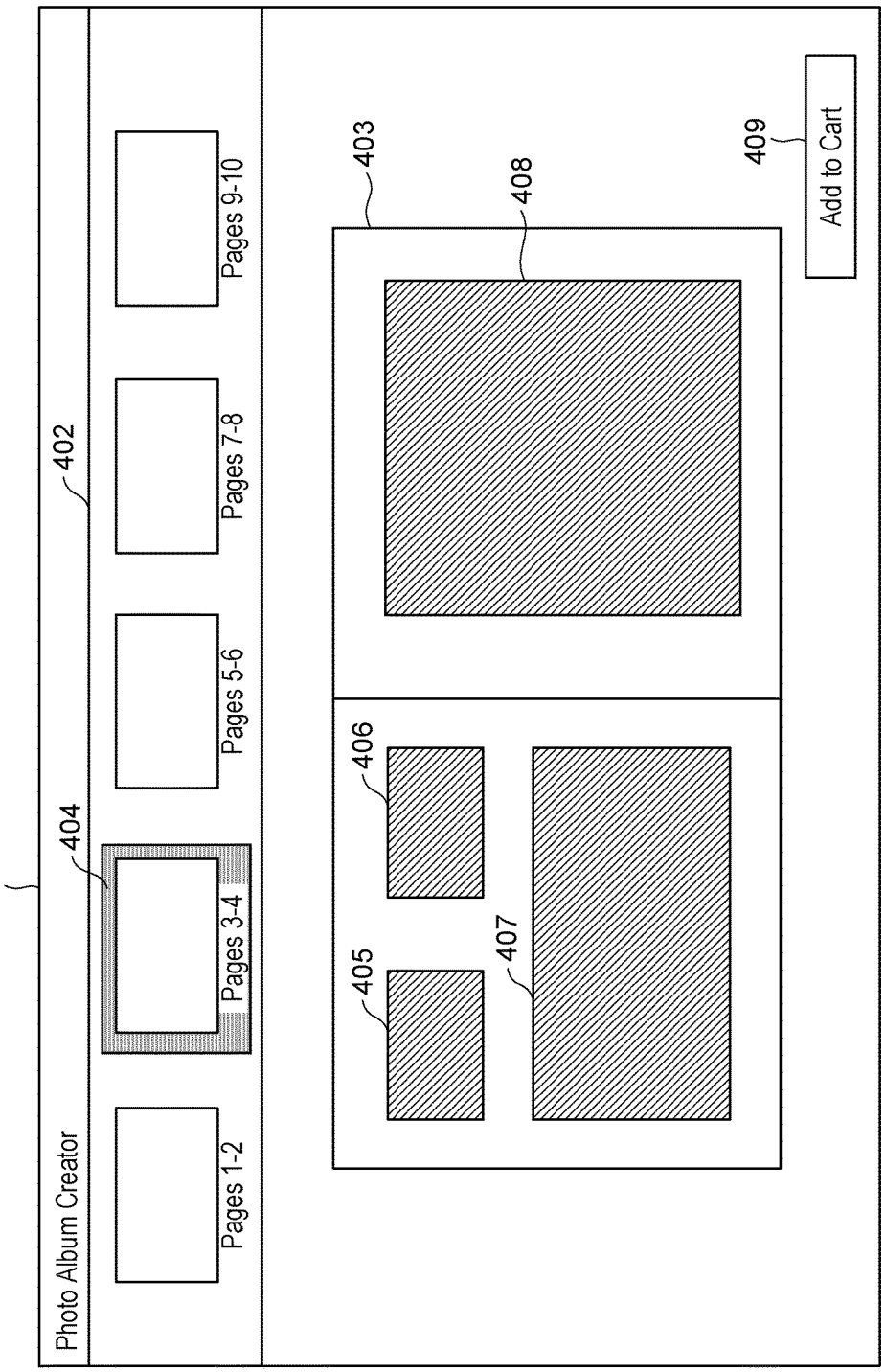
FIG. 4 illustrates an exemplary edit mg screen. displayed by the application according to the first embodiment.

FIG. 4 illustrates an exemplary editing screen used to edit the photo album using a photo album application. Referring to FIG. 4, an editing screen 401 is provided by the photo album application. A thumbnail of each two-page spread in the photo album is displayed in a display area 402. A preview image of the two-page spread selected in the display area 402 is displayed in a display area 403. The display area 403 is used to edit the layout image.

Upon selection of a desired thumbnail from the thumbnails of the two-page spreads in the display area 402 by the user, the corresponding two-page spread is displayed in a selected state, which is indicated by reference numeral 404. In the example in FIG. 4, pages 3 to 4 are selected and the layout image of the pages is displayed in the display area 403. An editing operation of the photo album is available in the display area 403. The template displayed in the layout image has one or more slots. In the example illustrated in FIG. 4, page 3 (the left page in the display area 403 in FIG. 4) has three slots 405, 406, and 407 and page 4 (the right page in the display area 403 in FIG. 4) has one slot 408. The slot is a photo slot and a photo is allocated to each slot. The corresponding photo is automatically allocated to each of the slots 405 to 408 in the first embodiment.

A button 409 is used to add the photo album created (edited) using the application into a cart. Upon depression of the button 409, the photo album that is edited is uploaded to the shopping site 251 via the Internet 300.

An image appropriate for an image frame is automatically laid out in each slot described above. In the first embodiment, images near a target slot or images appropriate for the feature of the target slot are displayed as the target images to be changed. The target images to be changed are called candidate images.

Figure 9:
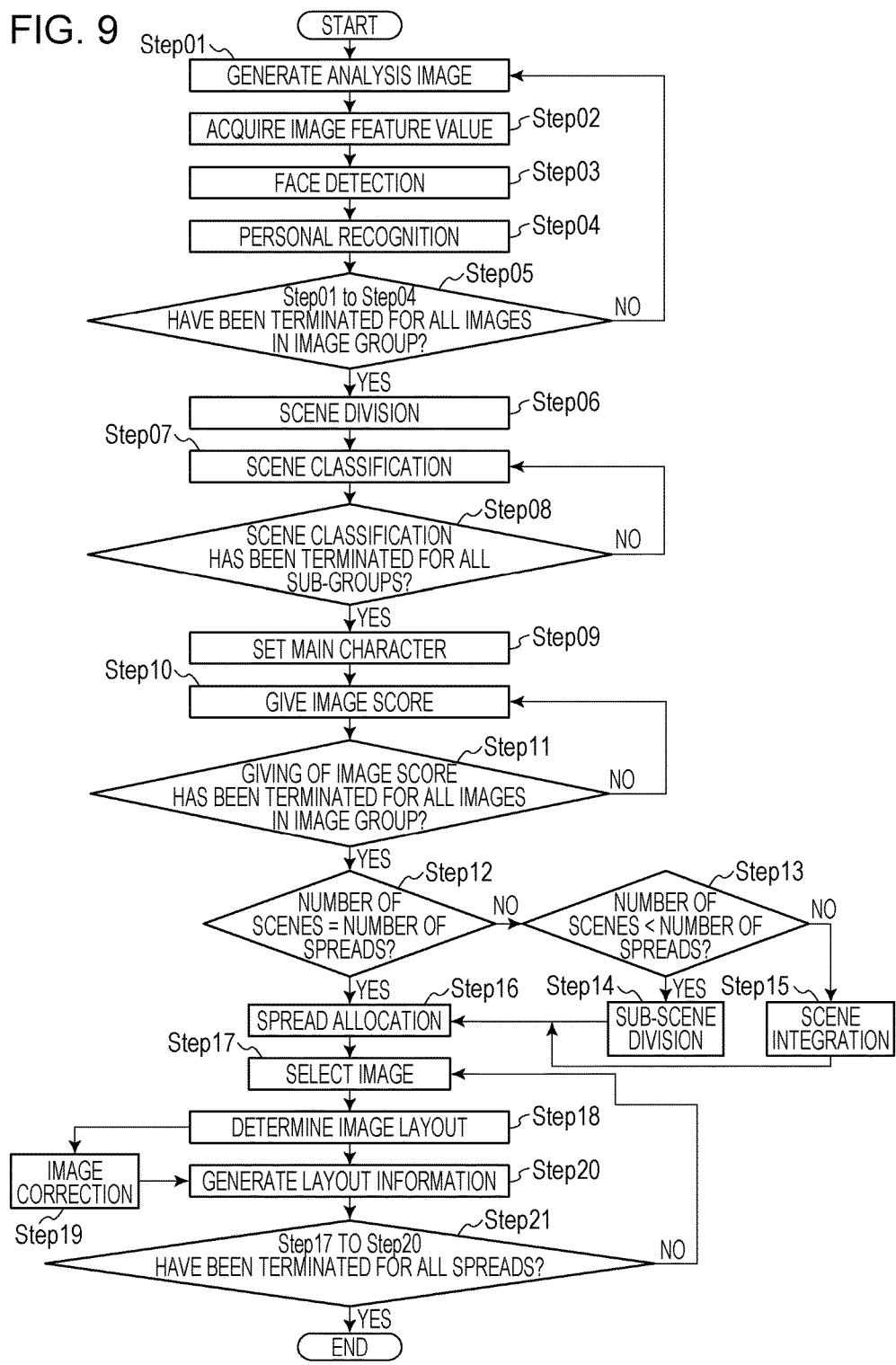
FIG. 9 is a flowchart illustrating an exemplary automatic layout process according to the first embodiment.

FIG. 9 is a flowchart illustrating an exemplary automatic layout process performed by the automatic layout processing unit 216 in the album creation application of the first embodiment. The flowchart illustrated in FIG. 9 is realized by the CPU 101 that reads out the program stored in the HDD 104 into the ROM 103 and executes the program that is read out. The automatic layout process will now be described with reference to FIG. 9. As described below, in the first embodiment, in the creation of the photo album, the image group used for creating the photo album is divided into sub-image groups based on the image capturing times and the images to be arranged in each page are selected from each sub-image group resulting from the division.

Referring to FIG. 9, in Step 01, the image converter 203 generates an analysis image. Each image in the image group, which is specified by the album creation condition specifying unit 201 and which is acquired from the HDD 104, is converted so as to have a desired pixel count and desired color information. The pixel count and the color information here are determined in advance and stored. In the first embodiment, the image data that is input is converted into analysis image data having a pixel count of 420 pixels on narrow sides and color information in the sRGB color space.

In Step 02, the image analyzer 204 acquires the feature value of the image data. The date and time when the image is captured are acquired from information associated with each piece of image data included in the image group acquired from the HDD 104. In the first embodiment, the date and time when the image is captured are acquired from the Exif information associated with each piece of image data. In addition, the feature value is acquired from the analysis image data generated in Step 01. The feature value represents, for example, focusing. A well-known Sobel filter may be used to detect edges. Specifically, the edges of the image are detected using the Sobel filter and the difference in luminance between the starting point and the end point of each edge is divided by the distance between the starting point and the end point to calculate the inclination of the edge. The average inclination of the edges in each image is calculated. The image having a high average inclination is determined to be in focus, compared with the image having a low average inclination. In the first embodiment, multiple inclination threshold values are set and it is determined whether the amount of focusing is permitted by determining which inclination threshold value the average inclination is higher than or equal to. Specifically, in the first embodiment, two different inclination threshold values are set and the amount of focusing is determined using three degrees: ○, Δ, and ×. The inclination of focusing is ○ (preferable) if the average inclination of the edges in the image is higher than or equal to first threshold value, the inclination of focusing is Δ (permitted) if the average inclination of the edges in the image is higher than or equal to a second threshold value lower than the first threshold value, and. the inclination of focusing is × (not permitted) if the average inclination of the edges in the image is lower than the second threshold value.

In Step 03, the image analyzer 204 performs face detection in each piece of image data. The face detection. is performed to the image data generated in Step 01. Common methods may be used for the face detection. The common methods include, for example, Adaboost in which a strong discriminator is created from multiple weak discriminators. In the first embodiment, the face of each person (object) is detected with the strong discriminator created using Adaboost. The face image is detected (extracted) and the upper left coordinate value and the lower right coordinate value in the image of the position of the detected face image are acquired in Step 03. The "image" here means the image represented by the image data generated in Step 01. The identification of the coordinate values of two kinds allows the position and the size of the face of the person to be identified. Although the face of the person is detected here, the detection target is not limited to the face of the person. Instead of the face of the person, objects including animals, such as dogs and cats, flowers, foods, buildings, and figurines may be detected with the strong discriminator created using Adaboost. In other words, objects other than the face may be detected.

In Step 04, the image analyzer 204 performs the personal recognition. First, the similarity between the face image extracted in Step 03 and a typical face image stored in a face dictionary database for every personal ID is examined. Then, the personal ID having the similarity higher than or equal to a threshold value and having the highest similarity is determined to be the ID of the extracted face image. In other words, the person corresponding to the personal ID having the similarity higher than or equal to the threshold value and having the highest similarity is identified as the person of the extracted face image. If the similarity is lower than the threshold value, a new personal ID is given to the extracted face image as a new person and the new personal ID is registered in the face dictionary database.

Image analysis information about each piece of image data acquired from Step 02 to Step 04 is grouped for each image ID, as illustrated in FIG. 10, and is stored in the HDD 104. The information about the date and time when the image is captured and the result of determination of focusing, which are acquired in Step 02, and the number of faces and the positional information, which are detected in Step 03, are stored as the image analysis information about each piece of image data. Although multiple face images may be included in the image based on one piece of image data, the positional information about each face is stored for each personal ID acquired in Step 04. When no face is detected in the image data, the information about the date and time when the image is captured and the result of determination of focusing, which are acquired in Step 02, are stored.

In Step 05, it is determined whether Step 01 to Step 04 have been terminated for all the images in the image group in the HDD 104, which is specified by the album creation condition specifying unit 201. If it is determined that Step 01 to Step 04 have not been terminated (NO in Step 05), the process goes back to Step 01. If it is determined that Step 01 to Step 04 have been terminated (YES in Step 05), the process goes to Step 06.

In Step 06, the image classifier 205 performs scene division. The scene division means that the image group that is acquired is divided into multiple sub-image groups depending on their scenes. Specifically, the image group is divided into multiple sub-image groups based on the difference in time between the images using the information about the dates and times when the images are captured, which is acquired in Step 02. When the dates when the images are captured are not continuous, that is, when at least one date when no image is captured exists between the dates when the images are captured, the image group is divided. A case in which the dates when the images are captured are continuous will now be described. In the first embodiment, the image group is divided if the difference between the times when the images are captured is greater than or equal to 16 hours. When the difference between the times when the images are captured is smaller than 16 hours, the image group is divided if the difference in time between the first time when the image is captured and the last time when the image is captured in each of the continuous days is smaller than four hours. When the difference in time between the first time when the image is captured and the last time when the image is captured in each of the continuous days is greater than or equal to four hours, the image group is divided if the number of images captured in each of the continuous days is smaller than 50 and the image group is not divided if the number of images captured in each of the continuous days is greater than or equal to 50. The threshold values of the difference in time and the threshold value of the number of captured images in the division are not limited to the above ones. FIG. 11A illustrates the result of division performed in the above manner.

In Step 07, the image classifier 205 performs scene classification. Although a case is exemplified in the first embodiment in which each sub-image group (each scene) is classified into Travel, Usual day, or Ceremony, the classification is not limited to this. First, multiple sub-image groups each of which is determined in advance to be classified into Travel, Usual day, or Ceremony are acquired. The feature values of the capturing are acquired for each sub-image group. The feature values acquired in the first embodiment are, for example, an image capturing period, the number of captured images, and the number of persons in one image. The image capturing period is the difference in time between the time when the first image is captured and the time when the last image is captured in the image group. The number of captured images is the number of images (the number of photos) included in the sub-image group. The number of persons in one image is the number of faces in each image including the faces. In other words, the number of persons in one image is the number of faces included in one image. Then, the average value and the standard deviation of the image capturing period, the average value and the standard deviation of the number of captured images, and the average value and the standard deviation of the number of persons in one image are calculated for each of the multiple sub-image groups. In the first embodiment, the number of faces in one image corresponds to the number of persons in one image. FIG. 12 is a table illustrating an example of the average value and the standard deviation of each of the image capturing period (time), the number of captured images, and the number of persons in one image. These values are incorporated in advance in the program of the album creation application. After the album creation application is started, the average value of each of the image capturing period, the number of captured images, and the number of persons in one image is calculated for each sub-image group resulting from the division in Step 06 in the image group specified by the user. Then, the scores of the feature values: the image capturing period, the number of captured images, and the number of persons in one image of each sub-image group and the average score of each scene are calculated according to the following equations based on the average values and the standard deviations:

Score=50−|10×(Average value−Feature value)/Standard deviation|   (1)

Average score=(Score of image capturing period+Score of the number of captured images+Score of the number of persons in one image)/The number of feature value items   (2)

The average score of each of Travel, Usual day, and Ceremony is calculated in the above manner. The scene having the highest score of each sub-image group is classified as the scene of the sub-image group. When two or more scenes have the same score, the scenes are classified based on priority order. For example, the priority order is Usual day>Ceremony>Travel in the first embodiment. Usual day has the highest priority. The priority order is not limited to the above one and the user may set the priority order.

The image capturing period of a sub-image group (5) resulting from the scene division in FIG. 11A was 36 hours, the number of captured images thereof was 300, and the number of persons in one image thereof was 1.7. The average score of Travel was 45.32, the average score of Usual day was 18.38, and the average score of Ceremony was −29.92. As a result, the scene of the sub-image group (5) was classified into Travel. The sub-image group is managed in association with a scene ID so as to identify the scene.

In Step 08, it is determined whether the scene classification in Step 07 has been terminated for all the sub-image groups resulting from the division in Step 06. If it is determined that the scene classification in Step 07 has not been terminated for all the sub-image groups (NO in Step 08), the process goes back to Step 07. If it is determined that the scene classification in Step 07 has been terminated for all the sub-image groups (YES in Step 08), the process goes to Step 09.

In Step 09, the image scorer 207 sets the main character. The setting of the main character is performed to the image group specified by the user and is performed in two modes: an automatic setting mode and a manual setting mode. When the main character is automatically set, the main character is set based on the result of the personal recognition in Step 04 and the result of the scene division in Step 06. Specifically, the count of each personal ID appearing in the sub-image group, the count of each personal ID appearing in each scene, the count of scenes where each personal ID appears, and so on are identified from the result in Step 04 to automatically set the main character from these pieces of information. In the first embodiment, the personal ID appearing in multiple scenes is set as the main character ID when the sub-image group has the multiple scenes and the personal ID that frequently appears in a scene, compared with the other IDs, is set as the main character ID when the sub-image group has the single scene. When a specific icon is specified in a main character setting unit by the user, the personal ID corresponding to the icon selected via the main-character information inputter 206 is passed to the image scorer 207. When the personal ID specified by the user exists, the main character ID set through the automatic setting is ignored and the personal ID specified by the user is set as the main character ID. The setting based on the specification of the main character setting unit is referred to as the manual setting.

In Step 10, the image scorer 207 gives the score. The score is the value referred to in selection of an image described below and the score is given to each piece of image data according to the following evaluation criteria. How to give the score will now be described with reference to FIGS. 13A and 13B and FIG. 15.

FIG. 15 illustrates exemplary templates used in layout of three images. A template 1601 illustrated in (1-1) in FIG. 15 is one template and includes a main slot 1602, a sub-slot 1603, and a sub-slot 1604. The main slot 1602 is the main slot in the template 1601 (the frame where the image is laid out) and is larger than the sub-slot 1603 and the sub-slot 1604. In other words, the main slot is the largest slot in each template. The sub-slots are the slots other than the main slot in each template. Both the main slot score and the sub-slot scores are associated with each piece of image data.

FIG. 13A illustrates criteria in the giving of the score to each piece of image data. More specifically, FIG. 13A is a table indicating features of images, which have high scores, for each of the scenes: Travel, Usual day, and Ceremony. As illustrated in FIG. 13A, different slots have different features having high scores. For example, when the scene of the sub-image group is classified into Travel, Zoom-out image including person and landscape has a high. score as the main slot and Close-up image and/or profile image has a high score as the sub-slot. For example, when the scene of the sub-image group is classified into Usual day, Close-up image and/or profile image has a high score as the main slot and Zoom-out image including person and landscape has a high score as the sub-slot. For example, when the scene of the sub-image group is classified into Ceremony, Image including two persons close to each other has a high score as the main slot and Image including many persons has a high score as the sub-slot. As described above, the features having high scores, that is, the evaluation criteria are varied depending on the kinds of the scene and the slot. In the first embodiment, the features having high scores depending on the kinds of the scene and the slot are set in advance in the application and are included in the program. The features having high scores are not limited to the above ones. The score is given to each piece of image data included in each sub-image group based on the features of the main slot and the sub-slot of each scene illustrated in FIG. 13A. The number of faces in each image, the position of each face in each image, and the size of each face in each image are acquired, the average value and the standard deviation are calculated for each scene and each slot type (each of the main slot and the sub-slot), and the average value and the standard deviation that are calculated are stored in the program of the album creation application. Which scene the image represented by each piece of image data in the image group specified by the user belongs to (is classified into) is determined from the result of the scene classification in Step 07. The score and the average score are calculated according to the following equations based on the average value and the standard deviation, which correspond to the scene of the target image and which are calculated in advance, and the feature values including the number of faces, the position of each face, and the size of each face of the main character ID in the target image:

Score=50−|10×(Average value−Feature value)/Standard deviation

Average score=(Score of the number of faces+Score of the position of each face+Score of the size of each face)/The number of feature value items The giving of the score is performed for both the main slot and the sub-slot. The score may be added to the image having the image ID the feature value of focusing in FIG. 10 of which is ○, among the images used in the album. This increases the score of the image that is in focus. FIG. 13B illustrates an example of the scores of each image. The scores of the main slot and the sub-slot are given to each image ID.

In Step 11, the image scorer 207 determines whether the giving of the score in Step 10 has been terminated for all the images in the image group specified by the user. If the image scorer 207 determines that the giving of the score in Step 10 has not been terminated (NO in Step 11), the process goes back Step 10. If the image scorer 207 determines that the giving of the score in Step 10 has been terminated (YES in Step 11), the process goes to Step 12.

In Step 12, the spread allocator 209 determines whether the number of scenes (the number of sub-image groups) resulting from the scene division in the image classifier 205 is equal to the number of spreads supplied by the number-of-spreads inputter 208. If the spread allocator 209 determines that the number of scenes is not equal to the number of spreads (NO in Step 12), the process goes to Step 13. If the spread allocator 209 determines that the number of scenes is equal to the number of spreads (YES in Step 12), the process goes to Step 16. For example, when the number of divided scenes in FIG. 11A is eight and the number of spreads supplied by the number-of-spreads inputter 208 is eight, the process goes to Step 16.

In Step 13, the spread allocator 209 determines whether the number of scenes resulting from the scene division in the image classifier 205 is smaller than the number of spreads supplied by the number-of-spreads inputter 208. If the spread allocator 209 determines that the number of scenes is not smaller than the number of spreads (NO in Step 13), the process goes to Step 15. If the spread allocator 209 determines that the number of scenes is smaller than the number of spreads (YES in Step 13), the process goes to Step 14. For example, when the number of divided scenes in FIG. 11A is eight and the number of spreads supplied by the number-of-spreads inputter 208 is ten, the process goes to Step 14 because the number of divided scenes is smaller than the number of spreads.

In Step 14, the spread allocator 209 performs sub-scene division. The sub-scene division means that the divided scenes are further divided if the number of divided scenes<the number of spreads. The sub-scene division will now be described, taking a case in which the number of divided scenes in FIG. 11A is eight and a specified number of spreads is ten as an example. FIG. 11B illustrates the result of the sub-scene division of FIG. 11A. The sub-scene division of the sub-image groups at points indicated by broken-line arrows produces 10 divided scenes. The criteria of the sub-scene division include the number of images and the date and time when each image is captured. The sub-image group having a larger number of images is identified from the result of the scene division in FIG. 11A. Since the number of scenes is to be increased from eight to ten in this case, two sub-image groups having larger number of images are identified. The sub-image group having the largest number of images is the sub-image group (5) and the sub-image groups having the next largest number of images are a sub-image group (1) and a sub-image group (2). In the first embodiment, when the numbers of images included in the sub-image groups are equal to each other, the sub-image group having a large difference in time between the first image and the last image in the sub-image group is to be subjected to the sub-scene division. Although the images of the same number are included in the sub-image group (1) and the sub-image group (2), the difference in time between the first image and the last image of the sub-image group (2) is larger than that of the sub-image group (1). Accordingly, the sub-image group (2) is to be subjected to the sub-scene division. Specifically, in the case in FIG. 11B, the sub-image group (5) and the sub-image group (are further divided. First, how to divide the sub-image group is described. The sub-image group (2) has two peaks of the number of images and the two peaks differ from each other in their image capturing dates. In this case, the sub-image group is divided at a portion where the image capturing date is changed (the portion of the broken-line arrow in FIG. 11B). Next, how to divide the sub-image group (5) is described. The sub-image group (5) has three peaks of the number of images and the three peaks differ from each other in their image capturing dates. Also in this case, the sub-image group is divided at portions where the image capturing date is changed. The sub-image group (5), which has two portions where the image capturing date is changed, is divided so that the difference in the number of images between the respective sub-image groups after the sub-scene division is made small. In FIG. 11B, the sub-image group (5) is divided at the boundary between the second day and the third day because the division at the boundary between the second day and the third day reduces the difference in the number of images between the sub-image groups after the sub-scene division, compared with a case in which the sub-image group (5) is divided at the boundary between the first day and the second day. Specifically, the sub-image group (5) is subjected to the sub-scene division at the portion of the broken-line arrow in FIG. 11B. The number of sub-image groups is changed from eight to ten in the above manner. Although the sub-scene division is performed at the portions where the image capturing date is changed here, the sub-scene division is performed at a portion having the largest difference in time in one day when the images in the sub-image group having a large number of images are captured in the single day.

In Step 15, the spread allocator 209 performs scene integration. The scene integration means that the divided scenes (sub-image groups) are integrated when the number scenes is larger than the number of spreads. Specifically, the scene integration is performed so that the number of scenes is made equal to the number of spreads. FIG. 11C illustrates a result of the scene integration of FIG. 11A, in which the number of scenes is made six when the number of spreads is six. The scene integration is performed at portions of broken lines, that is, the scene division is not performed at the portions of the broken lines to make the number of scenes (the number of sub-image groups) six. In the scene integration, the sub-image groups having smaller numbers of images are identified. Since the number of divisions is to be decreased from eight to six here, the sub-image groups having smaller numbers of images are identified. The sub-image groups having smaller number of images are a sub-image group (8), a sub-image group (3), and a sub-image group (7) in ascending order. Accordingly, first, the sub-image group (8) is set as an integration target. The number of images in the sub-image group (3) is equal to that in the sub-image group (7). However, since the sub-image group (8) adjacent to the sub-image group (7) is the integration target, the sub-image group (3) is to be subjected to the scene integration. Next, it is determined whether the sub-image group, which is the integration target, is integrated with the sub-image group previously captured or the sub-image group subsequently captured. The scene integration crone sub-image group (3) is first described. Comparison of the difference in time between the sub-image group (3) and the previous sub-image group (2) and the difference in time between the sub-image group (3) and the next sub-image group (4) indicates that the difference in the capturing time between the last image in the sub-image group (3) and the first image in the sub-image group (4) is smaller than the difference in the capturing time between the first image in the sub-image group (3) and the last image in the sub-image group (2). Accordingly, it is determined that the sub-image group (3) is to be integrated with the sub-image group (4). In other words, the scene integration is performed at the portion of the broken line in FIG. 11C. The scene integration of the sub-image group (8) is next described. Since the sub-image group (8) has no subsequent sub-image group, the sub-Image group (8) is integrated with the sub-image group (7). In other words, the scene integration is performed at the portion of the broken tine in FIG. 11C. Although the sub-image groups having a smaller difference in time are integrated with each other in the first embodiment, the first embodiment is not limited to this. For example, the sub-image group, which is the integration target, may be integrated with the sub-image group having a smaller number of images.

In Step 16, the spread allocator 209 performs spread allocation. The number of the sub-image groups is made equal to the number of specified spreads through Step 12 to Step 15. In the first embodiment, the sub-image group having the first, capturing date is allocated to the first spread. In other words, the sub-image groups are allocated to the respective spreads of the album in the order of the image capturing dates. This allows the album in which the sub-image groups are arranged in the order of the image capturing dates to be created. The images may not be arranged in the order of the image capturing dates in one spread page, as described below.

In Step 17, the image selector 210 selects images of a predetermined number from each sub-image group. A case will now be described with reference to FIGS. 14A to 14I, in which four images are selected from the sub-image group allocated to a certain spread. The spread here represents two pages and the first spread and the last spread each have one page. FIG. 14A indicates the difference in the image capturing date and time between the first image and the last image included in the sub-image group allocated to the spread, that is, the image capturing period of the sub-image group. How to select the first image in the selection of four images will now be described with reference to FIG. 14B. One main slot 1602 exists in the template. The image for the main slot is selected as the first image. Among all the images captured during the image capturing period of the sub-image group illustrated in FIG. 14B, the main slot image having the highest score given in Step 10 is selected. The sub-slot images are selected as the second and subsequent images. In the first embodiment, selection of images from image capturing periods resulting from division of the image capturing period of the sub-image group prevents the images from being heavily selected from part of the image capturing period of the sub-image group. First, as illustrated in FIG. 14C, the image capturing period of the sub-image group is divided into two to set the two image capturing periods. In other words, the sub-divided image capturing period is divided into two to set the two image capturing periods (the sub-divided image capturing period is grouped). Next, as illustrated in FIG. 14D, the sub-slot image having the highest score is selected as the second image from the image capturing period (a period indicated by a solid line) from which the first image has not been selected. Next, as illustrated in FIG. 14E, each image capturing period in FIG. 14D is divided into two. The sub-slot image having the highest score is selected as the third image, among the images captured during a period indicated by a solid line in FIG. 14F, that is, during the two image capturing periods from which the first and second images have not been selected (among the images corresponding to the two image capturing periods). A case will now be described in which no image exists in the image capturing period from which an image is to be selected and the image selection is unavailable, taking selection of the fourth image as an example. In the first embodiment, the image capturing period is divided based on time, regardless of the number of images. Accordingly, there are cases in which no image exists in the image capturing period resulting from the division. For example, as illustrated in FIG. 14G, it is assumed that, although the fourth image is to be selected. from the image capturing period (a diagonally shaded period) where no image has been selected, no image exists in this diagonally-shaded period. In this case, as illustrated in FIG. 14H, each image capturing period from which the image has been selected is divided into two. Next, as illustrated in FIG. 14I, the sub-slot image having the highest score is selected as the fourth image, among the images captured during the image capturing periods indicated by the solid lines from which the first to third images have not been selected.

In Step 18, the image layout creator 212 determines the image layout on the spread to be processed. A case will now be exemplified, in which the template inputter 211 has input templates (1-1) to (4-4) in FIG. 15 into a certain spread in accordance with the template information that is specified. Three slots exist in each of the input templates. It is assumed that arrangement of the three longitudinal or lateral images that are selected in the order of the image capturing dates and times results in a state illustrated by (A) in FIG. 15. It is also assumed that an image 1605 is an image selected for the main slot and an image 1606 and an image 1607 are images selected for the sub-slots. In the first embodiment, the oldest image is laid out on an upper left portion of the template and the latest image is laid out on a lower right portion of the template. Since the image 1605 has the latest image capturing date and time and is for the main slot, templates (3-1) to (3-4) in FIG. 15 are candidates. The older image 1606 for the sub-slot, that is, the image to be arranged on an upper left portion is a longitudinal image and the later image 1607 is a lateral image. Accordingly, the template (3-2) is selected as the template most appropriate for the selected image, thereby determining the layout. As described above, the template used in the layout and the information used to identify which image is to be laid out in which slot in the template are determined in Step 18. Although the case in which the number of slots is three is exemplified in FIG. 15, templates each including four slots may be prepared when four images are required in Step 17 and the degrees of coincidence between the slot state and the image state of the respective templates may be determined. Which template the image is to be laid out may be determined based on the degrees of coincidence.

In Step 19, the image corrector 214 performs the image correction. When the image correction condition. inputter 213 inputs ON, the image corrector 214 performs the image correction. In the first embodiment, the dodging correction, the red-eye correction, and the contrast correction are automatically performed in the image correction. When the image correction condition inputter 213 inputs OFF, the image corrector 214 does not perform the image correction. Turning ON or OFF of the image correction is performed for the image that has a pixel count of 420 pixels on narrow sides and that is converted into the sRGB color space.

In Step 20, the layout information outputter 215 generates the layout information. The respective images are laid out in the manner determined in Step 18. At this time, the images to be laid out are subjected to variable magnification in accordance with the size information about each slot in the template for layout. Then, the bitmap data indicating the images laid out in the template is generated.

Figure 5:
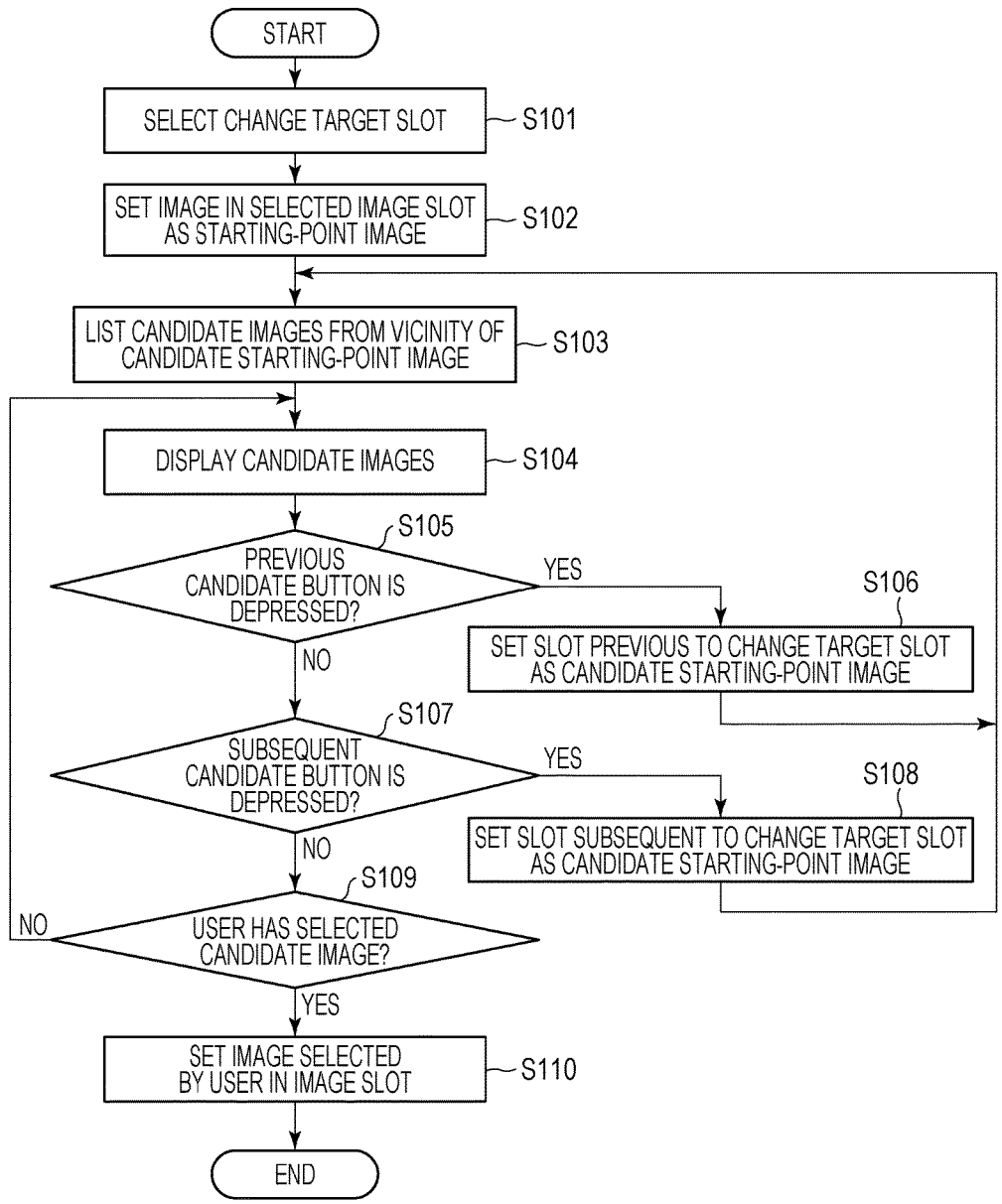
FIG. 5 is a flowchart illustrating an exemplary display process of candidate images according to the first embodiment.

In Step 21, it is determined whether Step 17 to Step 20 have been terminated for all the spreads. If Step 17 to Step 20 have not been terminated for all the spreads (NO in Step 21), the process goes back to Step 17. If Step 17 to Step 20 have been terminated for all the spreads (YES in Step 21), the automatic layout process is terminated. FIG. 5 is a flowchart illustrating an exemplary display process. The display process illustrated in FIG. 5 is realized by the CPU 101 that executes the program of the album creation application, which is stored in the HDD 104 and which is loaded into the ROM 103.

Referring to FIG. 5, upon selection of an image slot the images in which are to be changed (hereinafter referred to as a change target slot) by the user, in Step S101, the CPU 101 accepts the selection of the image slot. In Step S102, the CPU 101 sets the image currently allocated to the selected image slot as a starting-point image (hereinafter referred to as a candidate starting-point image). The candidate starting-point image is an image from which search for the image to be changed is started.

In Step S103, the candidate images are listed from the vicinity of the candidate starting-point image. In Step S104, the images that are listed are displayed on the editing screen in the display unit 105 as the candidate images for change of images. In the first embodiment, the candidate images are listed from the vicinity of the candidate starting-point image and are not arranged in other slots. How to list the candidate images from the vicinity of the candidate starting-point image will be described in detail below. A button used to display the candidate images that are allocated to the slots previous to the change target slot and that are captured (such a button is hereinafter referred to as a previous candidate button) is provided on the editing screen (user interface) displayed in Step S104. In addition, a button used to display the candidate images that are allocated to the slots subsequent to the change target slot (such a button is hereinafter referred to as a subsequent candidate button) is provided on the editing screen. In other words, both the previous candidate button and the subsequent candidate button are switch buttons for switching the candidate images.

In Step S105, it is determined whether the previous candidate button is depressed. If the previous candidate button is depressed (YES in Step S105), in Step S106, the image allocated to the slot previous to the change target slot is set as the candidate starting-point image. In other words, the candidate starting-point image is changed. Then, the process goes back to Step S103. In Step S103, the candidate images are listed again. In Step S104, the candidate images are displayed. It is assumed here that, in the template, a left-side slot is previous to a right-side slot and an upper slot is previous to a lower slot. In other words, in the template, the upper left slot is the most previous slot. For example, referring to FIG. 4, the slot previous to the slot 408 is the slot 407, the slot previous to the slot 407 is the slot 406, and the slot previous to the slot 406 is the slot 405. When no previous slot exists in the template including the change target slot, the slot in the immediately previous page corresponds to the previous slot. Specifically, the slot previous to the slot 405 is a slot on page 2.

In Step S107, it is determined whether the subsequent candidate button is depressed. If the subsequent candidate button is depressed (YES in Step S107), in Step S108, the image allocated to the slot subsequent to the change target slot is set as the candidate starting-point image. In other words, the candidate starting-point image is changed. Then, the process goes back to Step S103. In Step S103, the candidate images are listed again. In Step S104, the candidate images are displayed. It is assumed here that, in the template, a right-side slot is subsequent to a left-side slot and a lower slot is subsequent to an upper slot. In other words, in the template, the lower right slot is the most subsequent slot. For example, referring to FIG. 4, the slot next to the slot 405 is the slot 406, the slot next to the slot 400 is the slot 407, and the slot next to the slot 407 is the slot 408. When no subsequent slot exists in the template including the change target slot, the slot in the next page corresponds to the next slot. Specifically, the slot next to the slot 408 is a slot on page 5.

In Step S109, it is determined whether the user has selected a candidate image. If the user has selected a candidate image and the CPU 101 accepts the selection of the candidate image (YES in Step S109), in Step S110, the selected candidate image is allocated as the image of the change target slot. In other words, the image currently allocated to the change target slot is replaced with the selected candidate image. If the user has not selected a candidate image (NO in Step S109), the process goes back to Step S104.

Figure 6:
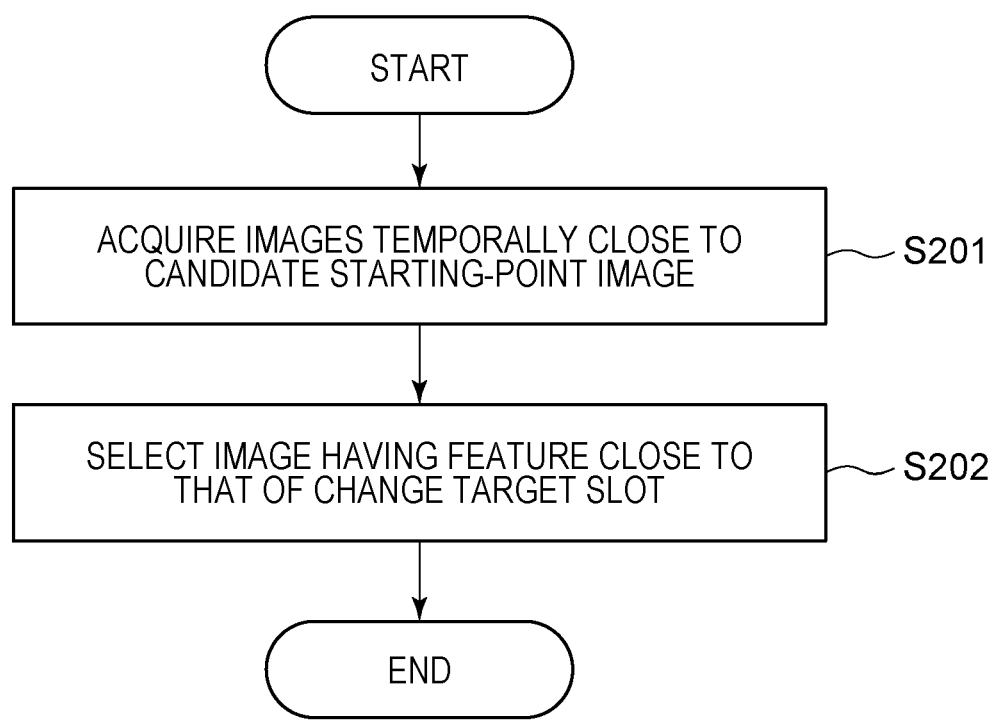
FIG. 6 is a flowchart illustrating an exemplary listing process of the candidate images according to the first embodiment.

FIG. 6 is a flowchart illustrating an exemplary process when the candidate images are listed based on the candidate starting-point image. The flowchart in FIG. 6 is a detailed flowchart of Step S103. Referring to FIG. 6, in Step S201, images temporally close to the candidate starting-point image are selected. When slot B is arranged adjacent to a slot A, images temporally close to the candidate starting-point image are selected so that a list of the candidate images temporally close to the photo arranged in the slot A is not overlapped with a list of the candidate images temporally close to the photo arranged in the slot B. In other words, the selection of images temporally close to the candidate starting-point image is controlled so that the same images are not listed as the candidate images of the slot A and the candidate images of the slot B. This prevents the same candidate images from being displayed when the candidate images of the slot B are displayed upon depression of the subsequent candidate button while the candidate images of the slot A are being displayed.

Figure 16A:
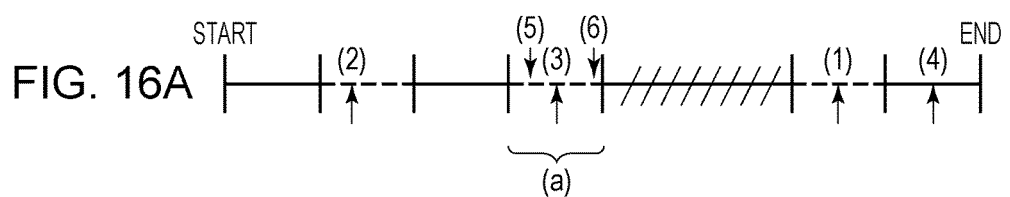
FIGS. 16A and 16B are diagrams for describing how to determine a change candidate image according to the first embodiment.
Figure 16B:
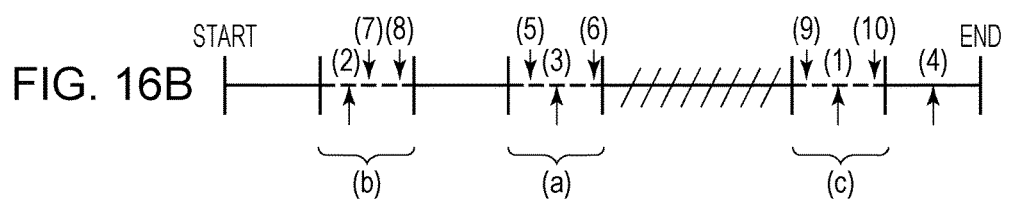

In Step S202, an image having the feature of the change target slot or having a feature close to the feature of the change target slot is selected from the images selected in Step S201. In other words, filtering of an image having the feature close to that of the change target slot is performed. The feature of the change target slot is, for example, the size or the shape of the change target slot or the feature of an image that is set in the change target slot and that is to be allocated. The feature of an image that is set in the change target slot is, for example, a color mode. In the case of an image slot to which a grayscale image is recommended to be allocated, a grayscale image is selected as the candidate of the image. When an image including a person is recommended to be allocated to the change target slot, an image including a person is selected. The shape of the change target slot is, for example, the feature of the aspect ratio, such as a vertical long shape or a horizontally long shape. For example, a vertical long image is selected when the change target slot is a vertical long slot and a horizontal long image is selected when the change target slot is a horizontal long slot. When the size of the change target slot is large, a large image is selected. The method of selecting an image based on the feature of the slot is not limited to the above one. The selection described above is realized by using a score axis allocated to the change target slot as the score axis. This allows an image more appropriate for the change target slot to be selected. A method of determining a change candidate image in the first embodiment will now be described with reference to FIGS. 16A and 16B. FIG. 16A illustrates the same state as that in FIG. 14I and illustrates the relationship between the images (1) to (4) laid out in the page and the image capturing times in the image group of the respective images. Referring to FIGS. 16A and 16B, the image capturing time advances from left to right. A case will now be described in which an image (3) in FIG. 16A, that is, the third image is the change candidate image selected by the user in Step S101 in FIG. 5. At this time, the image (3) is the starting-point image in Step S102 in FIG. 5. An image capturing period (a) in FIGS. 16A and 16B indicates the range "near the candidate starting-point image" in Step S103 in FIG. 5. It is assumed that multiple images other than the image (3) arranged in the slot exist in the image capturing period (a). An image (5) and an image (6) existing in the image capturing period. (a) have the next highest score, compared with the image (3) having the highest score. In this case, the images (5) and (6) are displayed in Step S104 in FIG. 5 as the change candidate images. As described above, the images having the higher scores are selected and displayed in Step S104 in FIG. 5.

In the first embodiment, the display of an image selected from the same image capturing period as that of the target slot as the candidate image allows the user to easily change the image without breaking the time series in the page.

In addition, instead of simply selecting an image temporally close to the change candidate image, an image having a higher score is selected from the image group corresponding to the same image capturing period and the selected image is displayed. This allows a high-quality layout image to be easily generated, compared with the case in which an image temporally close to the change candidate image is simply selected and displayed, without breaking the time series in the page. An image may be selected from the image group corresponding to the same image capturing period based on other criteria and the selected image may be displayed in FIG. 16A. For example, an image different from the image (3) arranged in the slot in the composition may be selected and displayed. Alternatively, a photo including an image of a person may be selected and displayed. This allows the taste of the page to be easily changed without breaking the time series in the page.

Although the case in which the two candidate images are displayed is exemplified in FIG. 16A, the display of the candidate images is not limited to this.

A method of determining a candidate image next to the change candidate image in FIG. 5 will now be described with reference to FIG. 16B. Specifically, the case in which the previous candidate button has been depressed (Steps S105 to S106) and the case in which the subsequent candidate button has been depressed (Steps S107 to S108) will now be described. First, the case in which the previous candidate button has been depressed is described. Before the previous candidate button is depressed, the two images (5) and (6) captured during the image capturing period (a) are displayed on the UI as the candidate images, as described above with reference to FIG. 16A. If the previous candidate button is depressed (YES in Step S105), the candidate starting-point image is moved to an image (2) during an image capturing period (b) temporally previous to the image capturing period (a) corresponding to the candidate image that is being displayed in Step S106. Then, candidate images (7) and (8) in the image capturing period (b) near the image (2) are listed in Step S103. Since the candidate images are selected from the image capturing period (b) temporally previous to the image capturing period (a) and the selected candidate images are displayed here, the user is capable of easily changing the image without greatly breaking the time series in the page. In the listing of the candidate image (7) and the candidate image (8) from the image group in the image capturing period (b), the images having higher scores may be selected, as in FIG. 16A, or the images may be selected using other methods. In contrast, if the subsequent candidate button is depressed (YES in Step S107), the candidate starting-point image is moved to an image (1) during an image capturing period (c) temporally subsequent to the image capturing period (a) corresponding to the candidate image that is being displayed in Step S108. Then, candidate images (9) and (10) in the image capturing period (c) near the image (1) are listed in Step S103. Since the candidate images are selected from the image capturing period (c) temporally subsequent to the image capturing period (a) and the selected candidate images are displayed here, the user is capable of easily changing the image without greatly breaking the time series in the page. The method of selecting the candidate images from the image group in the image capturing period (c) is the same as the method of selecting the candidate images from the image group in the image capturing period (b).

Although the case in which the two captured images are selected as candidate captured images is exemplified here, the number of the captured images selected as the candidate captured images is not limited to two and the images of an arbitrary number may be selected. A case illustrated in FIG. 7D will now be described in which four candidate captured images are displayed. In the first embodiment, two upper candidate captured images are determined as images having higher scores with a first evaluation method and two lower candidate captured images are determined as images having higher scores with a second evaluation method. This allows the images having different tastes and higher scores to be displayed as the candidate images.

Figure 7:
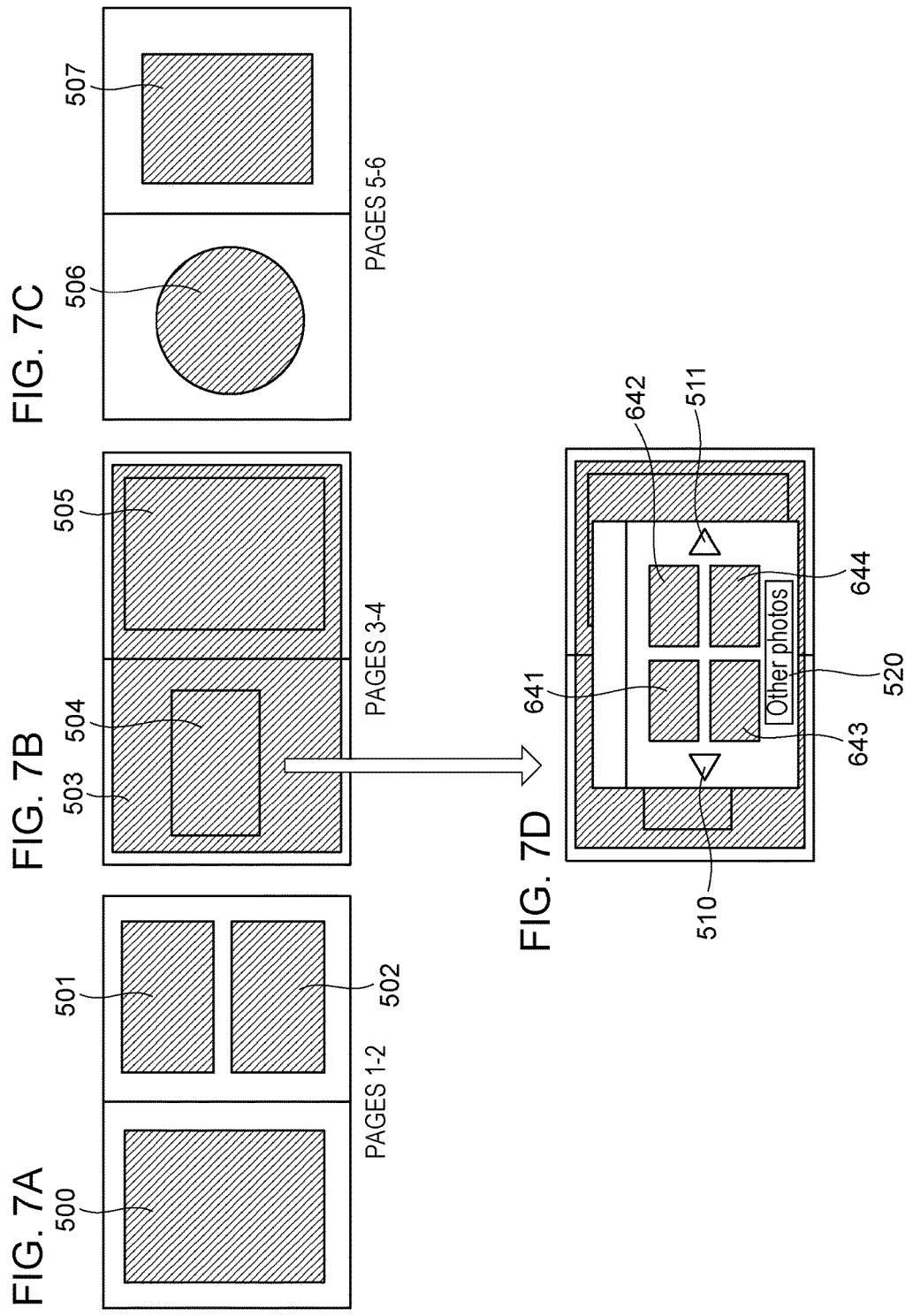
FIGS. 7A to 7D illustrate exemplary display screens in which the candidate images are displayed.

As described above, it is assumed in the first embodiment, as illustrated in FIGS. 16A and 16B, that the candidate images are listed from the vicinity of the candidate starting-point image and are not arranged in other slots. FIGS. 7A to 7D illustrate exemplary user interfaces in which the candidate images are displayed when the user changes the images. FIG. 7A illustrates an exemplary layout image (preview image) of pages 1 to 2 of the photo album, FIG. 7B illustrates an exemplary layout image (preview image) of pages 3 to 4 of the photo album, and FIG. 70 illustrates an exemplary layout image (preview image) of pages 5 to 6 of the photo album. Photos are arranged in photo slots 500, 501, and 502 in FIG. 7A. Photos are arranged in photo slots 503, 504, and 505 in FIG. 7B. Photos are arranged in photo slots 506 and 507 in FIG. 7C. In the layout image in FIG. 7B, the photo of the photo slot 504 and the photo of the photo slot 505 are overlaid on the photo of the photo slot 503. Photos may be arranged on a photo slot in the above manner in the first embodiment. It is assumed in the examples in FIGS. 7A to 7D that the photo is allocated to each slot in advance through the automatic layout. A case will now be described in which the user changes the photo of the photo slot 503. In response to touch (selection) of the photo slot 503 by the user, the layout image is changed to an exemplary editing screen illustrated in FIG. 7D. Candidate images 641 to 644 for the photo slot 503 are displayed on the editing screen. Although the four candidate images are displayed in the first embodiment, the number of candidate images displayed on the editing screen is not limited to four. The user is capable of selecting a photo to be arranged in the photo slot 503 from the candidate images 641 to 644. For example, when the user selects the candidate image 641, the photo of the candidate image 641 is allocated to the photo slot 503. The user changes the photo of the target photo slot by selecting the candidate image, as described above. When the target slot is the photo slot 503, depression of a previous candidate button 510 displays the candidate image of the photo slot 502 and depression of a subsequent candidate button 511 displays the candidate image of the photo slot 504. The user interface when the previous candidate button 510 or the subsequent candidate button 511 is depressed will be described below with reference to FIG. 8. A button 520 is used to display other images. Depression of the button 520 displays images that are not displayed as the candidate images. In the first embodiment, a list of images, for example, a list of images first selected by the user in the creation of the photo album is displayed in response to the depression of the button 520.

Figure 8:
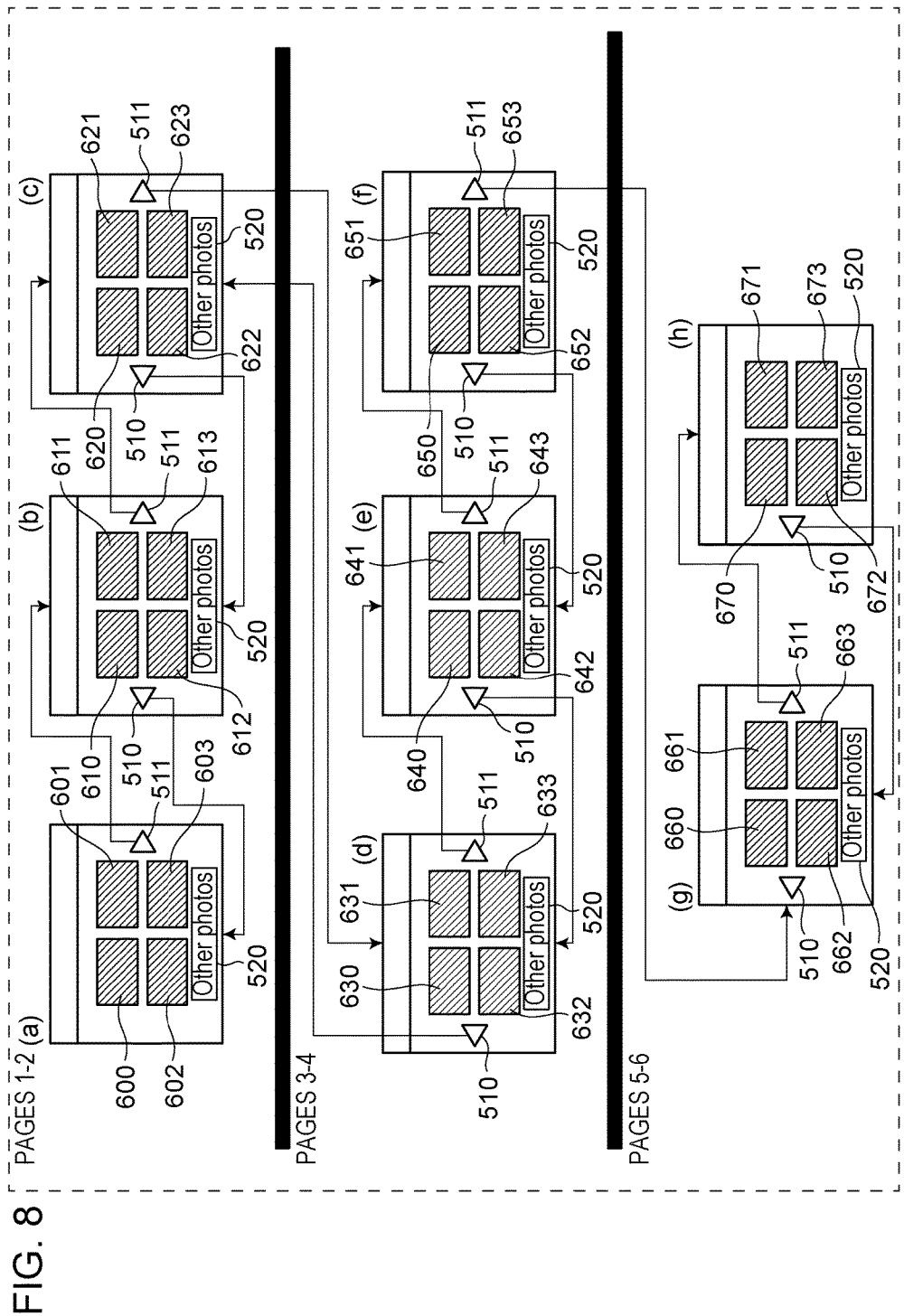
FIG. 8 includes exemplary display screens in which the candidate images are displayed.

FIG. 8 includes diagrams for describing an exemplary operation when the previous candidate button 510 or the subsequent candidate button 511 in FIG. 7D is depressed. Candidate image display screens on which the candidate images for each slot are displayed are illustrated in FIG. 8. The candidate images for each slot are selected based on the image arranged in the slot. More specifically, the candidate images for each slot are the candidates of the images listed from the starting point, which is the image arranged in the slot. Referring to FIG. 8, (a) indicates candidate images 600 to 603 for the photo slot 500, (b) indicates candidate images 610 to 613 for the photo slot 501, (c) indicates candidate images 620 to 623 for the photo slot 502, (d) indicates candidate images 630 to 633 for the photo slot 503, (e) indicates candidate images 640 to 643 for the photo slot 504, (f) indicates candidate images 650 to 653 for the photo slot 505, (g) indicates candidate images 660 to 663 for the photo slot 506, and (h) indicates candidate images 670 to 673 for the photo slot 507. In the first embodiment, each candidate image display screen illustrated in FIG. 8 is displayed on the editing screen of the layout image, as illustrated in FIG. 7D. Each candidate image display screen includes the previous candidate button 510 and the subsequent candidate button 511. When the slot has no previous slot, the previous candidate button 510 is not displayed, as in the candidate image display screen indicated in (a) in FIG. 8. When the slot has no subsequent slot, the subsequent candidate button 511 is not displayed, as in the candidate image display screen indicated in (h) in FIG. 8.

How to change the photo in the photo slot 503 will now be described. Upon selection of the photo slot 503 in FIG. 7B, the candidate image display screen (d) in FIG. 8 is displayed on the editing screen of the layout image including the photo slot 503. At this time, when the previous candidate button 510 is depressed on the candidate image display screen (d) in FIG. 8, the candidate images of the photo slot 502 previous to the photo slot 503 are displayed, as in the candidate image display screen (c) in FIG. 8. In other words, the candidate images on the candidate image display screen are changed. As illustrated in FIGS. 7A and 7B, the photo slot 502 is previous to the change target slot 503. As described above, in the first embodiment, the candidate images of the slots across pages are capable of being displayed. When the candidate image 620 on the candidate image display screen (c) is selected in this state, the candidate image 620 is allocated to the photo slot 503. When the subsequent candidate button 511 is depressed on the candidate image display screen (d) in FIG. 8, the candidate images of the photo slot 504 next to the photo slot 503 are displayed, as in the candidate image display screen (e) in FIG. 8. When the subsequent candidate button 511 is depressed on the candidate image display screen (e) in FIG. 8, the candidate images of the photo slot 505 are displayed. When the candidate image 640 on the candidate image display screen. (e) in FIG. 8 is selected, the candidate image 640 is allocated to the photo slot 503. Depression of the subsequent candidate button 511 displays the candidate images in the slot subsequent to the change target slot.

In the first embodiment, as described above, depression of the previous candidate button 510 or the subsequent candidate button 511 by the user displays the candidate images of the previous or next slot of the change target slot. Selection of any of the displayed candidate images enables the change of the image of the target slot. In addition, depression of the previous candidate button 510 or the subsequent candidate button 511 also allows the candidate images allocated to the slots of a template (page) other than the template (page)

including the change target slot to be displayed as the candidate images of the change target slot. The image allocated to the change target slot is capable of being changed to a different image in the above manner.

FIG. 19 illustrates an exemplary user interface displayed upon depression of the button 520 used to display other images, illustrated in FIG. 7D and FIG. 8, by the user. Upon depression of the button 520, a list of photos first selected by the user in the creation of the photo album is displayed, as illustrated in FIG. 19. All the images selected by the user may be displayed in the list of photos or part of the images selected by the user may be displayed in the list of photos.

Referring to FIG. 19, a thumbnail 2001 is a thumbnail of a photo selected by the user in the creation of the photo album and a file name 2002 is the name of the file of the photo corresponding to the thumbnail 2001. An OK button 2003 is used to determine the selection and a scroll bar 2004 is displayed when the list of photos includes many photos.

An identification mark 2005 indicates that the photo to which the identification mark 2005 is added is currently allocated to the change target slot and an identification mark 2006 indicates the photo to which the identification mark 2006 is added is currently allocated to a slot other than the change target slot. An identification mark 2007 indicates that the photo to which the identification mark 2007 is added is cut out from a video. In the first embodiment, not only a still image but also a video may be selected in the creation of the photo album. A photo cut out from a video may be arranged in the photo slot or may be displayed as the candidate image of the photo slot. The addition of the identification mark 2007, as in the user interface in FIG. 19, allows the user to easily recognize that the image is cut out from a video.

The thumbnails in the photo list may be arranged in a predetermined order, such as the order of the image capturing dates of the photos or the order of the file names. Alternatively, a user interface in which the order of arrangement can be selected may be provided and the user may select the order of arrangement. Instead of the file name 2002, other information concerning the photo, such as the date when the photo is taken, may be displayed with the thumbnail.

In the first embodiment, the identification mark 2005 indicating that the photo is currently allocated to the change target slot is displayed. Accordingly, when the thumbnails are arranged in the order of the image capturing dates of the photos, the user is capable of easily finding images the image capturing dates of which are close to that of the image currently allocated to the change target slot based on the photo to which the identification mark 2005 is added.

When the user interface in FIG. 19 is first displayed in response to the selection of the button 520 used to display other images, the scroll bar 2004 may be automatically displayed at a position where the image to which the identification mark 2005 is added is visible.

A mark that identifies images of another kind may be further added to the photo list. For example, a mark may be added to images read out from a memory card or a mark may be added to images acquired from an SNS site.

In addition, in the first embodiment, the identification marks 2005, 2006, and 2007 and other identification marks may be displayed on the candidate image display screens illustrated in FIG. 8. FIGS. 20A and 20B illustrate exemplary user interfaces in which the candidate images are displayed. In the exemplary user interfaces illustrated in FIGS. 20A and 2013, the candidate image display screen including candidate images 2111 to 2114 for a photo slot 2102 is displayed on a layout image (layout screen) including photo slots 2101, 2102, and 2103. As illustrated in FIGS. 20A and 20B, since a bold line 2121 is used as the frame line of the photo slot 2102 to be changed, the photo slot to be changed is capable of being identified. In addition, since a broken line 2120 is used as the frame line of the photo slot to which the candidate starting-point image is allocated, the photo slot to which the candidate starting-point image is allocated is capable of being identified. The display of the photo slot to be changed and the slot of the candidate starting-point image so as be identified allows the user to easily determine which photo is to be changed and which image is used as the candidate starting-point image in the display of the candidate images. Since the depression of the previous candidate button 510 or the subsequent candidate button 511 moves the slot of the candidate starting-point image, the broken line 2120 indicating the candidate starting-point image is also moved to another slot. The slot of the candidate starting-point image may be moved across pages. In this case, the broken line 2120 may not be displayed without changing the displayed page or the displayed page may be changed to indicate the slot of the candidate starting-point image to the user. Since the change target slot is not displayed when the displayed page is changed, a photo 2130 allocated to the change target slot may be displayed on the candidate image display screen, as illustrated in FIG. 20B.

In the first embodiment, the images near the image currently allocated to the image slot are displayed as the candidate images. Accordingly, the user is capable of easily selecting an image appropriate for the slot in the layout of the image. In the first embodiment, the images near the change target slot are displayed as the candidate images. Specifically, the candidate images are selected from the same image capturing period as that of the change target slot and the selected candidate images are displayed. This allows the user to easily change the image without breaking the time series in the page. In addition, instead of simply selecting the images temporally close to the change candidate image, presentation of the images having higher scores in the image group within the range of the same image capturing period allows images preferable to the album to be selected, compared with the case in which the images temporally close to the change candidate image are presented. In addition, it is possible to display the images appropriate for the feature of the target slot as the candidate images.

Furthermore, in the first embodiment, a predetermined number of the images near the target slot or a predetermined number of the images appropriate for the feature of the slot are displayed as the candidate images of the change target slot. This does not cause the difficulty in selection of images by the user, unlike a case in which the number of the candidate images is too large.

Furthermore, the candidate images are selected from the time period near the temporally previous slot also in the selection and display of next candidates of the change candidate images. Accordingly, the user is capable of easily changing the image without greatly breaking the time series in the page.

<Second Embodiment>

A second embodiment will now be described with reference to FIG. 17 and FIG. 18. The same reference numerals are used in the second embodiment, to identify the same components illustrated in the first embodiment. A description of such components is omitted herein.

Figure 17:
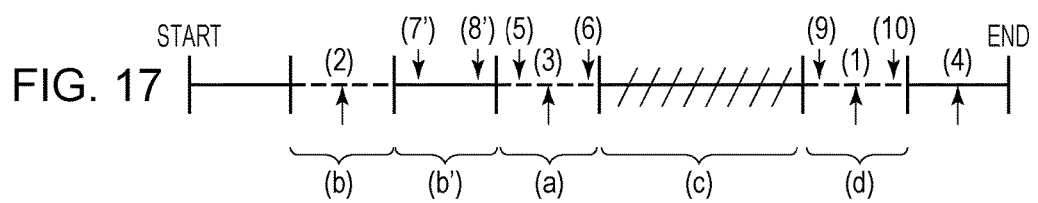
FIG. 17 is a diagram for describing how to determine the change candidate image according to a second embodiment.

FIG. 17 illustrates an example of how to present a next candidate of the change candidate image. In the second embodiment, as illustrated in FIG. 17, the method of selecting the change candidate image when the previous candidate button is depressed differs from that in the first embodiment. When the previous candidate button is depressed, the selection range of the candidate images is set to an image capturing period (b'). The image capturing period (b') is between the image capturing period (b) to which the image (2) arranged in the slot belongs and the image capturing period (a) to which the image (3) arranged in the change target slot belongs. A candidate image (7') and a candidate image (8') are selected from the image capturing period (b'). In other words, in the second embodiment, the candidate images are selected from the image capturing period immediately before the image capturing period to which the image arranged in the change target slot belongs and the selected candidate images are displayed. In contrast, when the subsequent candidate button is depressed, the selection range of the candidate images is set to an image capturing period (d), as in the first embodiment. This is because no image exists in the image capturing period (c). When any image exists in the image capturing period (c), images are selected from the image capturing period (c). In other words, in the second embodiment, the candidate images are selected from the image capturing period immediately after the image capturing period to which the image arranged in the change target slot belongs and the selected candidate images are displayed. Since the method of selecting the candidate images from the image capturing period is the same as that in the first embodiment, a description of this method is omitted herein.

FIG. 18 is a flowchart illustrating an exemplary display process of the candidate images in the second embodiment.

Referring to FIG. 18, since Step S1901 is the same as Step S101 in FIG. 5, a description of Step S1901 is omitted herein.

In Step S1902, an image capturing period (time period) to which the image of the slot selected by the user belongs is set as a "candidate image extraction time range". In Step S1903, the candidate images of a predetermined number are listed from the "candidate image extraction time range" that is set.

In Step S1904, the candidate images that are listed are displayed on the candidate image display screen. In Step S1905, it is determined whether the user has depressed the previous candidate button.

If it is determined that the user has depressed the previous candidate button (YES in Step S1905), in Step S1906, the "candidate image extraction time range" is changed. The "candidate image extraction time range" is updated to the image capturing period (time period) immediately before the "candidate image extraction time range" set at this time in Step S1906. Then, the process goes back to Step S1903. In Step S1903, new candidate images are listed. In Step S1904, the candidate images are displayed.

If it is determined that the user has not depressed the previous candidate button (NO in Step S1905), in Step S1907, it is determined whether the user has depressed the subsequent candidate button. If it is determined that the user has depressed the subsequent candidate button (YES in Step S1907), in Step S1908, the "candidate image extraction time range" is changed. The "candidate image extraction time range" is updated to the image capturing period (time period) subsequent to the "candidate image extraction time range" set at this time in Step S1908. Then, the process goes back to Step S1903. In Step S1903, new candidate images are listed. In Step S1904, the candidate images are displayed.

If it is determined that the user has not depressed the subsequent candidate button (NO in Step S1907), the process goes to Step S1909.

In Step S1909, it is determined whether the user has selected a candidate image. If it is determined that the user has not selected a candidate image (NO in Step S1909), the process goes back to Step S1904. If it is determined that the user has selected a candidate image (YES in Step S1909), in Step S1910, the image to be arranged in the target slot is updated to the selected image. Then, the display process in FIG. 18 is terminated.

In the second embodiment, the images near the image currently allocated to the image slot are displayed as the candidate images. Accordingly, the user is capable of easily selecting an image appropriate for the slot in the layout of the image. In the second embodiment, the images near the change target slot are displayed as the candidate images. Specifically, the candidate images are selected from the same image capturing period as that of the change target slot and the selected candidate images are displayed. This allows the user to easily change the image without breaking the time series in the page. In addition, instead of simply selecting the images temporally close to the change candidate image, presentation of the images having higher scores in the image group within the range of the same image capturing period allows images preferable to the album to be selected, compared with the case in which the images temporally close to the change candidate image are presented. In addition, it is possible to display the images appropriate for the feature of the target slot as the candidate images.

Furthermore, in the second embodiment, a predetermined number of the images near the target slot or a predetermined number of the images appropriate for the feature of the slot are displayed as the candidate images of the change target slot. This does not cause the difficulty in selection of images by the user, unlike a case in which the number of the candidate images is too large.

According to the second embodiment, the user is capable of easily selecting an image appropriate for the slot in the layout of the image.

<Other Embodiments>

The present invention is not limited to the above embodiments. For example, although the album creation. application is exemplified in the above embodiments, an application or an image processing apparatus using an image selecting process in which a recommended image is automatically selected may be used.

In the above embodiments, the positional order of the photo slots is set in the following manner: the photo slot at an upper left portion of each page has the highest order, the photo slot at an upper right portion of the page has the next highest order, the photo slot at a lower left portion of the page has the next order, and the photo slot at a lower right portion of the page has the next order. The photo slot allocated to the entire page, such as the photo slot 503, has the highest order in the page. The order of the photo slots in the template is not limited to the above ones. For example, the photo slot at an upper left portion of each page may have the highest order, the photo slot at a lower left portion of the page may have the next highest order, the photo slot at an upper right portion of the page nay have the next order, and the photo slot at a lower right portion of the page may have the next order.

Although the candidate images of the slot positioned immediately before or immediately after the change target slot are displayed with the previous candidate button 510 or subsequent candidate button 511 in the above embodiment, the candidate images are not limited to the above ones and it is sufficient to display the candidate images of a slot different form the change target slot. For example, the candidate images of the slot two pages before the page in which the change target slot is arranged may be displayed or the candidate image of the slot three pages after the page in which the change target slot is arranged may be displayed. The above embodiments are also realized by performing the following processing. Specifically, software (program) realizing the functions of the above embodiments is supplied to a system or an apparatus via a network or various storage media and a computer (for example, a CPU or a microprocessing unit (MPU)) in the system or the apparatus reads out the program to execute the program that is read out. The program may be executed by one computer or may be cooperatively executed by multiple computers. All the processes described above may not necessarily be realized by the software and part or all of the processes may be realized by hardware, such as an application specific integrated circuit (ASIC). All the processes may not necessarily be performed by one CPU and multiple CPUs may appropriately cooperatively perform the processes.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-157715, filed Aug. 7, 2015, which is hereby incorporated by reference herein in its entirety.

What is claimed is:

1. An image replacing apparatus comprising:
   one or more processors; and
   one or more memories storing instructions which, when executed by the one or more processors, cause the image replacing apparatus to perform operations including:
   acquiring an image data group from a database, wherein the image data group includes a plurality of image data files,
   generating layout data using a template having a plurality of slots that includes a first slot and a second slot, wherein the generated layout data includes a first image which was selected from the acquired image data group and is arranged in the first slot based on a first predetermined criteria, and includes a second image which was selected from the acquired image data group and is arranged in the second slot based on a second predetermined criteria that is different from the first predetermined criteria, and
   displaying the generated layout data as a layout image on a display screen, for a user,
   wherein, in response to receipt of a first input from the user, the image replacing apparatus further performs operations including:
   selecting, as a change target slot and based on the first user input, the first slot having the first image,
   selecting, from the acquired image data group, first candidate images based on the first image arranged in the change target slot,
   displaying, on the display screen for the user, the selected first candidate images,
   wherein, in response to receipt of a second input from the user selecting an item for changing the first candidate images, the image replacing apparatus further performs operations including:
   selecting, from the acquired image data group, second candidate images based on the second image arranged in the second slot,
   changing the displayed first candidate images to the second candidate images, and
   wherein, in response to receipt of a third input from the user selecting an image in the second candidate images, the image replacing apparatus further performs operations including:
   replacing the first image displayed in the first slot by displaying, in the first slot, an image selected by the user from the second candidate images displayed on the displayed screen.

2. The image replacing apparatus according to claim 1, wherein the second slot is arranged physically previous to the change target slot.

3. The image replacing apparatus according to claim 1, wherein the second slot is arranged physically subsequent to the change target slot.

4. The image replacing apparatus according to claim 1, wherein the first predetermined criteria is a first image capturing period.

5. The image replacing apparatus according to claim 4, wherein the second predetermined criteria is a second image capturing period that is different from the first image capturing period.

6. The image replacing apparatus according to claim 1, wherein the first predetermined criteria is a feature of the first slot, and the second predetermined criteria is a feature of the second slot that is different from the feature of the first slot.

7. The image replacing apparatus according to claim 6, wherein the feature of the first slot includes an aspect ratio of the first slot.

8. The image replacing apparatus according to claim 6, wherein the feature of the first slot includes a size of the first slot.

9. The image replacing apparatus according to claim 6, wherein the feature of the first slot includes a color mode of an image to be allocated to the first slot.

10. The image replacing apparatus according to claim 9, wherein displaying the selected first candidate images includes displaying an object and,
wherein, if the object is selected, replacing the image includes displaying a list of images and replacing the image displayed in the first slot by displaying, in the first slot, an image selected from the list of images.

11. The image replacing apparatus according to claim 1, wherein the display screen is provided by a photo album application.

12. The image replacing apparatus according to claim 1, wherein at least part of the instructions are included in a photo album application configured to communicate with the image replacing apparatus and generate an album image to be displayed in the display screen.

13. The image replacing apparatus according to claim 1, wherein the acquired image data group is based on input from a user specifying album creation conditions.

14. The image replacing apparatus according to claim 13, wherein the album creation conditions include at least one of a main character, the number of spreads, a template type, and whether image correction is to be performed.

15. The image replacing apparatus according to claim 1,
wherein the acquired image data includes social networking services images, and
wherein the image replacing apparatus is configured to cause a button to be displayed on the display screen that, upon being depressed, causes a photo album to be added to a shopping cart for purchase.

16. A method for an image replacing apparatus, the method comprising:
acquiring an image data group from a database, wherein the image data group includes a plurality of image data files;
generating layout data using a template having a plurality of slots that includes a first slot and a second slot, wherein the generated layout data includes a first image which was selected from the acquired image data group and is arranged in the first slot based on a first predetermined criteria, and includes a second image which was selected from the acquired image data group and is arranged in the second slot based on a second predetermined criteria that is different from the first predetermined criteria; and
displaying the generated layout data as a layout image on a display screen for a user,
wherein, in response to receipt of a first input from the user, the method further includes: selecting, as a change target slot and based on the first user input, the first slot having the first image;
selecting, from the acquired image data group, first candidate images based on the first image arranged in the change target slot;
displaying, on the display screen for the user, the selected first candidate images;
wherein, in response to receipt of a second input from the user selecting an item for changing the first candidate images, the method further includes:
selecting, from the acquired image data group, second candidate images based on the second image arranged in the second slot;
changing the displayed first candidate images to the second candidate images; and
wherein, in response to receipt of a third input from the user selecting an image in the second candidate images, the method further includes:
replacing the first image displayed in the first slot by displaying, in the first slot, an image selected by the user from the second candidate images displayed on the displayed screen.

17. The method according to claim 16, wherein the second slot is arranged physically previous to the change target slot.

18. The method according to claim 16, wherein the second slot is arranged physically subsequent to the change target slot.

19. The method according to claim 16, wherein the first predetermined criteria is a first image capturing period.

20. The method according to claim 19, wherein the second predetermined criteria is a second image capturing period that is different from the first image capturing period.

21. The method according to claim 16, wherein the first predetermined criteria is a feature of the first slot, and the second predetermined criteria is a feature of the second slot that is different from the feature of the first slot.

22. The method according to claim 21, wherein the feature of the first slot includes an aspect ratio of the first slot.

23. The method according to claim 21, wherein the feature of the first slot includes a size of the first slot.

24. The method according to claim 21, wherein the feature of the first slot includes a color mode of an image to be allocated to the first slot.

25. The method according to claim 24,
wherein displaying the selected first candidate images includes displaying an object and,
wherein, if the object is selected, replacing the image includes displaying a list of images and replacing the image displayed in the first slot by displaying, in the first slot, an image selected from the list of images.

26. The method according to claim 16, wherein the display screen is provided by a photo album application.

27. The method according to claim 16, wherein at least part of the instructions are included in a photo album application configured to communicate with the image replacing apparatus and generate an album image to be displayed in the display screen.

28. The method according to claim 16, wherein the acquired image data group is based on input from a user specifying album creation conditions.

29. The method according to claim 28, wherein the album creation conditions include at least one of a main character, the number of spreads, a template type, and whether image correction is to be performed.

30. The method according to claim 16,
wherein the acquired image data includes social networking services images, and
wherein the image replacing apparatus is configured to cause a button to be displayed on the display screen that, upon being depressed, causes a photo album to be added to a shopping cart for purchase.

31. A non-transitory computer-readable recording medium storing a program to cause a computer to perform a method for an image replacing apparatus, the method comprising:
acquiring an image data group from a database, wherein the image data group includes a plurality of image data files;
generating layout data using a template having a plurality of slots that includes a first slot and a second slot, wherein the generated layout data includes a first image which was selected from the acquired image data group and is arranged in the first slot based on a first predetermined criteria, and includes a second image which was selected from the acquired image data group and is arranged in the second slot based on a second predetermined criteria that is different from the first predetermined criteria; and displaying the generated layout data as a layout image on a display screen for a user, wherein, in response to receipt of a first input from the user, the method further includes: selecting, as a change target slot and based on the first user input, the first slot having the first image;

selecting, from the acquired image data group, first candidate images based on the first image arranged in the change target slot;

displaying, on the display screen for the user, the selected first candidate images;

wherein, in response to receipt of a second input from the user selecting an item for changing the first candidate images, the method further includes:

selecting, from the acquired image data group, second candidate images based on the second image arranged in the second slot;

changing the displayed first candidate images to the second candidate images; and wherein, in response to receipt of a third input from the user selecting an image in the second candidate images, the method further includes:

replacing the first image displayed in the first slot by displaying, in the first slot, an image selected by the user from the second candidate images displayed on the displayed screen.

32. A server comprising:
the image replacing apparatus according to claim 1; and
a shopping site configured to receive input from a user of a photo album application located outside of the server to allow the user to order a photo album using the shopping site.

33. The server according to claim 32, wherein the photo album includes an album image represented by image data to be displayed in the display screen.

34. An image replacing apparatus having one or more processors and one or more memories storing a photo album application, the photo album application comprising: instructions that, when executed by the one or more processors, cause the image replacing apparatus to perform operations including: acquiring an image data group from a database, wherein the image data group includes a plurality of image data files, generating layout data using a template having a plurality of slots that includes a first slot and a second slot, wherein the generated layout data includes a first image which was selected from the acquired image data group and is arranged in the first slot based on a first predetermined criteria, and includes a second image which was selected from the acquired image data group and is arranged in the second slot based on a second predetermined criteria that is different from the first predetermined criteria, and-displaying the generated layout data as a layout image on a display screen for a user, wherein, in response to receipt of a first input from the user, the image replacing apparatus further performs operations including: selecting, as a change target slot and based on the first user input, the first slot having the first image, selecting, from the acquired image data group, first candidate images based on the first image arranged in the change target slot, displaying, on the display screen for the user, the selected first candidate images, wherein, in response to receipt of a second input from the user selecting an item for changing the first candidate images, the image replacing apparatus further performs operations including: selecting, from the acquired image data group, second candidate images based on the second image arranged in the second slot, changing the displayed first candidate images to the second candidate images, and wherein, in response to receipt of a third input from the user selecting an image in the second candidate images, the image replacing apparatus further performs operations including: replacing the first image displayed in the first slot by displaying, in the first slot, an image selected by the user from the second candidate images displayed on the displayed screen.

* * * * *